US007831676B1

(12) United States Patent
Nagar

(10) Patent No.: US 7,831,676 B1
(45) Date of Patent: Nov. 9, 2010

(54) METHOD AND SYSTEM FOR HANDLING EMAIL

(76) Inventor: Ajay R. Nagar, 2111 Hickory Trail Pl., Katy, TX (US) 77450

( * ) Notice: Subject to any disclaimer, the term of this patent is extended or adjusted under 35 U.S.C. 154(b) by 408 days.

(21) Appl. No.: 12/070,852

(22) Filed: Feb. 21, 2008

Related U.S. Application Data

(60) Provisional application No. 60/902,472, filed on Feb. 21, 2007.

(51) Int. Cl.
*G06F 15/16* (2006.01)
(52) U.S. Cl. .............. 709/206; 709/203; 709/223; 709/224
(58) Field of Classification Search ........ 709/223, 709/224, 203, 206, 217, 218, 219
See application file for complete search history.

(56) References Cited

U.S. PATENT DOCUMENTS

| | | | | |
|---|---|---|---|---|
| 5,956,486 | A * | 9/1999 | Hickman et al. | 709/206 |
| 6,151,606 | A * | 11/2000 | Mendez | 707/610 |
| 6,330,589 | B1 * | 12/2001 | Kennedy | 709/206 |
| 6,598,076 | B1 * | 7/2003 | Chang et al. | 709/206 |
| 6,662,212 | B1 * | 12/2003 | Chandhok et al. | 709/206 |
| 6,886,030 | B1 * | 4/2005 | Easterbrook et al. | 709/206 |
| 6,965,918 | B1 * | 11/2005 | Arnold et al. | 709/206 |
| 7,024,457 | B1 * | 4/2006 | Newman et al. | 709/206 |
| 7,155,481 | B2 * | 12/2006 | Prahlad et al. | 709/206 |
| 7,296,058 | B2 * | 11/2007 | Throop | 709/206 |
| 7,328,251 | B2 * | 2/2008 | Ahmed et al. | 709/207 |
| 7,444,382 | B2 * | 10/2008 | Malik | 709/206 |
| 7,493,367 | B1 * | 2/2009 | Newman et al. | 709/206 |
| 7,567,542 | B2 * | 7/2009 | Rybak et al. | 370/338 |
| 7,664,824 | B2 * | 2/2010 | Kobayashi et al. | 709/217 |
| 2006/0095527 | A1 * | 5/2006 | Malik | 709/206 |
| 2006/0143274 | A1 * | 6/2006 | Schulz et al. | 709/206 |
| 2008/0168135 | A1 * | 7/2008 | Redlich et al. | 709/204 |
| 2009/0013043 | A1 * | 1/2009 | Tan | 709/205 |
| 2009/0063648 | A1 * | 3/2009 | Malik et al. | 709/206 |
| 2009/0204721 | A1 * | 8/2009 | Yost et al. | 709/232 |
| 2009/0234863 | A1 * | 9/2009 | Evans | 707/100 |
| 2010/0011077 | A1 * | 1/2010 | Shkolnikov et al. | 709/206 |
| 2010/0049812 | A1 * | 2/2010 | Brown et al. | 709/206 |

* cited by examiner

*Primary Examiner*—Lashonda T Jacobs

(57) ABSTRACT

The invention includes a system that selectively or automatically creates email packages by parsing emails into email elements such as attachments, email reply bodies, storing them in the system's database and then grouping the elements from different selected emails to form email packages. Emails that satisfy user-defined keywords and criteria are also included in packages and their summary is displayed for a quick retrieval. An example is creating email workgroups, each containing emails that pertain to a set of activities or a specific project, and visually presenting them to users. By storing the links between an email and its elements, the invention facilitates the gathering of statistical information pertaining to different email interactions and action states, attachment-sharing across multiple users, assigning versions to the modified iterations, and cross-referencing them to the originating emails. The links further facilitate identification of email propagation relationships as emails proliferate across multiple users.

10 Claims, 22 Drawing Sheets

Fig. 1

An Embodiment of How Email Elements such as Attributes, Field Elements and Data are Stored in Database Tables

101     102

The scope and order of email elements contained in this example are not limiting

| Email attribute, element, data | Table |
|---|---|
| Email ID (could be from email header, other optional elements that are current or added in the future email structures or contents or are generated by our system) | 1 |
| Subject including track of original and as modified in transit | 2 |
| Subject Type (RE, FW, or modification thereof, or None) | 3 |
| Interaction Type (Sent, Received) | 4 |
| Date/Time stamp Sent | 5 |
| Date/Time stamp Received | 6 |
| Importance Flag (High, Normal, Low etc) | 7 |
| Follow up Flags (For Your Information, No Response Needed, Reply etc) | 8 |
| Sensitivity (Normal, Personal, Private etc) | 9 |
| Folder (e.g. Inbox, Sent, Draft, user-created etc) | 10 |
| Folder Location (logical, physical paths in Email and System) | 11 |
| Due Date, Time etc | 12 |
| To (parse email name, domain and extension ) | 13 |
| From (parse email name, domain and extension ) | 14 |
| CC (parse email name, domain and extension ) | 15 |
| BCC (parse email name, domain and extension ) | 16 |
| Attachments (YES, NO, Just a Name) | 17 |
| Attachments, filenames, Type, Size, etc | 18 |
| Attachment Cross-Reference to Parent Email | 19 |
| Attachment Signature 1 (e.g. character count, random or preset content word/characters such as $1^{st}$, $15^{th}$, $99^{th}$ etc) | 20 |
| Attachment Signature 2 (e.g. byte size, 'type of file' id) | 21 |
| Attachment Signature 3 others | 22 |
| Attachment Signature n (combination of any of above) | 23 |
| Email Body Text 1 | 24 |
| Email Body Text Signature 1 | 25 |
| Email Body Text Signature 2 | 26 |
| Email Body Text Signature n | 27 |
| Email Body Text 2 | 28 |
| Email Body Text Signature 1 (e.g. digital id) | 29 |
| Email Body Text Signature 2 (e.g. count of characters, lines, blank space, specific letters) | 30 |
| Email Body Text Signature n (e.g. random or preset word/characters such as $1^{st}$, $20^{th}$, $39^{th}$ etc) | 31 |
| Master Signature (all or some combined) | 32 |
| Email Body Text 2 | 33 |
| Email Body Text Signature 1 (e.g. digital id) | 34 |
| Email Body Text Signature 2 (e.g. character count) | 35 |
| Email Body Text Signature n (e.g. random word/characters such as $5^{th}$, $19^{th}$, $25^{th}$ etc) | 36 |
| Master Signature (all or some combined) | 37 |
| Email Body Text n | 38 |
| Email Body Text Signature 1 (e.g. digital id) | 39 |
| Email Body Text Signature 2 (e.g. character count) | 40 |
| Email Body Text Signature n (e.g. random word/characters such as $8^{th}$, $12^{th}$ etc) | 41 |
| Master Signature (all or some combined) | 42 |

Fig. 2

An Embodiment of How User-Defined Keywords and Criteria are stored in Database Tables

The scope and order of email elements contained in this example are not limiting

201 → | 202 →

| Email element | Table |
|---|---|
| User-defined keyword 1 | 43 |
| User-defined keyword 2 | 44 |
| User-defined keyword n | 45 |
| User-defined Phrase 1 | 46 |
| User-defined Phrase n | 47 |
| User-defined Combination Keywords: keyword 1, keyword 2, ... keyword n | 48 |
| User-defined Combination Keywords-Phrases: keyword 1, ...n ; phrase 1,...n | 49 |
| User-defined Criteria: Criteria 1 | 50 |
| User-defined Criteria: Criteria n | 51 |
| User-defined Mixed Combination: keywords 1-n; phrase 1-n; criteria 1-n | 52 |
|  | 53 |
| Elements from other (3rd-party) search engines that could include, but not limited to, attachment, porting, embedding etc. | 54 |
| Support logic such as fuzzy, semantic, hakia etc. |  |
| Inventive system-defined keyword 1 | 55 |
| System-defined keyword 2 | 56 |
| System-defined keyword n | 57 |
| Inventive System Data 1 (e.g., Does new email match with an existing email stored in inventive system?) | 58 |
| Data 2 (e.g. association for a match that occurs to Subject, Email Text, To, From etc) | 59 |
| Data 3 additional details | 60 |
| Data 4 Tracking, processing etc | 61 |
| Data n etc | 62 |
|  | So on |
|  |  |

Fig. 3

An Embodiment of the Invention Assigning Labels to a Single Email with Multiple Message Bodies The scope and order of email elements contained in this example are not limiting
The association can be performed using the technique listed below or any other 'identifier assigning' techniques available in the computing and programming world.
For example purposes, the parent (complete) Email is referred as Email-A.
1. Email-A contains a last email body and two Replies identified as Email-A1 and Email-A2.
2. The labels create an association with each email element and tracked by the invention and stored in
3. The email elements the invention can handle are not limited to what is illustrated here.
4. ATTA, ATTB, ATTC are sequential identifiers applied to facilitate elements and data that have a      301
5. Hierarchy relationship to another element such as TO that can contain multiple email addresses.

| Email Elements (Attributes, Fields and Data) | Label |
|---|---|
| Email-A <parent email> | PID1 SID1 ATTA1 |
| TYPE = Original or RE or FW or DRAFT etc | PID1 SID1 ATTA2 |
| SUBJECT = <email title as appears in subject line> | PID1 SID1 ATTA3 |
| TO = <all the email addresses that appear in this field> | PID1 SID1 ATTA4, ATTB1 to ATTBn |
| FROM = <all the email addresses that appear in this field> | PID1 SID1 ATT5, ATTB1 to ATTBn |
| CC = <all the email addresses that appear in this field> | PID1 SID1 ATT6, ATTB1 to ATTBn |
| BCC = <all the email addresses appear in this field> | PID1 SID1 ATT7 |
| DATE | PID1 SID1 ATT8 |
| TIME | PID1 SID1 ATT9 |
| IMPORTANCE = NORMAL or LOW or HIGH | PID1 SID1 ATT10 |
| SENSITIVTY = NORMAL or PRIVITE | PID1 SID1 ATT11 |
| FOLLOW UP or NO RESPONSE NEEDED etc | PID1 SID1 ATT12 |
| DUE DATE and TIME | PID1 SID1 ATT13 |
| Number of email Replies that are embedded in this email | PID1 SID1 ATT14 |
| Number of attachments associated with this Email | PID1 SID1 ATT15, |
| The content of the first body of the email (of Email-A) | PID1 SID1 ATT16, ATTB1 to ATTBn, ATTn |
| First attachment attached to this email | PID1 SID1 ATT17 |
| First Attachment's link to the email | PID1 SID1 ATT17, ATTB1 |
| First Attachment's attributes such filename, format, size, timestamp etc | PID1 SID1 ATT17, ATTB1 to ATTBn |
| Second Attachment attached to this email | PID1 SID1 ATT18 |
| <and so on> | |
| Email-A1 <second email, or the Reply that appears in the parent email> | PID1 SID2 ATT1 |
| SUBJECT = <email title as appears in subject line> | PID2 SID2 ATT2 |
| TO | PID1 SID2 ATTA4, ATTB1 to ATTBn |
| FROM | PID1 SID2 ATT5, ATTB1 to ATTBn |
| CC | PID1 SID2 ATT6, ATTB1 to ATTBn |
| BCC | PID1 SID2 ATT7 |
| DATE | PID1 SID2 ATT8 |
| TIME | PID1 SID2 ATT9 |
| IMPORTANCE = NORMAL or LOW or HIGH | PID1 SID2 ATT10 |
| SENSITIVTY = NORMAL or PRIVITE | PID1 SID2 ATT11 |
| FOLLOW UP or NO RESPONSE NEEDED etc | PID1 SID2 ATT12 |
| DUE DATE and TIME | PID1 SID2 ATT13 |
| Number of email Replies that are embedded in this email | PID1 SID2 ATT14 |
| < and so on> | |
| Email-A2 <Third email, or the 2nd Reply that appears in the parent email> | PID1 SID3 ATT1 |
| SUBJECT = <email title as appears in subject line> | PID2 SID3 ATT2 |
| TO | PID1 SID3 ATTA4, ATTB1 to ATTBn |
| FROM | PID1 SID3 ATT5, ATTB1 to ATTBn |
| CC | PID1 SID3 ATT6, ATTB1 to ATTBn |
| BCC | PID1 SID3 ATT7 |
| DATE | PID1 SID3 ATT8 |
| TIME | PID1 SID3 ATT9 |
| IMPORTANCE = NORMAL or LOW or HIGH | PID1 SID3 ATT10 |
| SENSITIVTY = NORMAL or PRIVITE | PID1 SID2 ATT11 |
| FOLLOW UP or NO RESPONSE NEEDED etc | PID1 SID2 ATT12 |
| DUE DATE and TIME | PID1 SID2 ATT13 |
| Number of email Replies that are embedded in this email | PID1 SID2 ATT14 |

Fig.10

An Embodiment of the Invention to Create a Consolidated Email for an Email Package with Email Message Bodies from a Same Email Conversation 'Assign Labels' indicate the action of the present invention assigning label(s) unique or otherwise, that can be associated to email bodies, elements, attributes, data such as but not limited to, text, IDs (PID, SID), header, comparison data, attachment(s).

'Attribute Data' indicate the actual information that relate to, but not limited to, 'Assign Labels'
'System Storage' indicate but not limited to, a single or multiple tables, a single or multiple databases, active, and/or passive memory of email system vendor or customer (user) and inventive systems.
'Commit to Storage' indicate the action of storing 'Attribute Data' in 'System Storage'

For reference purposes,
- A body indicates one email message body within an email, with its associated attachments and all the related elements (attributes, field and data) applicable to that email body. It could be the first email or a Reply (RE) or a Forward (FW).
- An email conversation or a thread indicate emails that are Replies of Forward initiated by other email users that are part of the same original email conversation.

Explanation of the Table
1. Shows the original email body, EMAIL-A, and then other emails EMAIL-B, EMAIL-C and EMAIL-D that contain replies;
2. Each email is synchronized with time sequence. That is, EMAIL-A is triggered at Time Sequence 1, EMAIL-B at 2 an so on;
3. EMAIL-A in column 3 is the original email. It has only one body reply referenced as EMAIL-A1. It's email Subject is "Quote Request". The inventive method does a compare and if a match is not found, stores all elements of this email in the inventive system database. The consolidated email generated by the inventive system will have one email body, referenced as EMAIL-A1 shown in column 7;
4. EMAIL-B in column 4 is the 2$^{nd}$ email initiated in time sequence 2. It contains two bodies, EMAIL-B1 which is the latest body, and EMAIL-A1 that is the original email body embedded in this email. The invention invokes a comparison of bodies with elements in the database and stores body EMAIL-B1 in the inventive system database and instead, it links it to EMAIL-B. It finds a match to EMAIL-A1 so it does not store it and instead creates a link of the email copy found in the database in its place in EMAIL-B. The inventive system also can also generate a consolidated email that can have only two time-sequenced bodies, EMAIL-B1 and EMAIL-A1 as shown in column 7 with no duplicates;
5. EMAIL-C in column 5 is the third email initiated in time sequence 3. It contains the latest (or new) body EMAIL-C1, and two previous bodies, EMAIL-B1 and EMAIL-A1 embedded in the email. It compares each body with the elements in the database and stores EMAIL-C1 in the database. It does not store EMAIL-B1 or EMAIL-C1 as they already exist in the database and instead, it creates links to Email-C. It can generate a consolidated email that can only contain a single body of each occurrence, such as EMAIL-C1, EMAIL-B1 and EMAII-A1 in that order of time sequence as shown in column 7; and
6. EMAIL-D in column 6 is the fourth email initiated in time sequence 4. It contains only two bodies; the latest body EMAIL-D1 and the original body, EMAIL-A1. The invention compares these bodies with emails in the database and stores EMAIL-D1 in the database. It does not store EMAIL-A1 as it finds a match and instead creates a link instead to EMAIL-D. The invention can also generate a single consolidated email that can have each of the four different bodies only once, as shown in column 7.

The invention can in addition perform the following
1. Associate a link to each email where it finds a body already to exist in the inventive database as per the examples stated above
2. Can construct emails from the database that are identical to the original emails such as EMAIL-A, EMAIL-B, EMAIL-C and EMAIL, with each containing the original multiple bodies as they appear in columns 3,4,5 and 6;
3. Can construct a consolidated email in any combination of emails and/or email bodies and their associated attachments. This could be a new email that is a combination of EMAIL-B and EMAILC, or EMAIL-A and EMAIL-D and so forth. The packaged email generated can contain all email bodies that previously made up each of the original emails and their associated attachments. This could comprise of duplicate or single, unduplicated bodies; and
4. Provide presentation of the reconstructed consolidated emails in any acceptable user interface format, or a reporting or a graphical format.

| 1 | 2 | 3 — 1002 | 4 — 1003 | 5 — 1004 | 6 — 1005 | 7 — 1001 |
|---|---|---|---|---|---|---|
| Time Sequence | Subject & Attributes | Email content of 4 separate emails with same subject | | | | Our storage method & consolidated email |
| | | EMAIL-A | EMAIL-B | EMAIL-C | EMAIL-D | |
| 4 | Subject | | | | Re: Request Quote | Re: Request Quote |
| | Body, fields + Attachment(s) | | | | EMAIL-D1 | EMAIL-D1 |
| 3 | Subject | | | Fw: Request Quote | | Fw: Request Quote |
| | Body, fields + Attachment(s) | | | EMAIL-C1 | | EMAIL-C1 |
| 2 | Subject | | Re: Request Quote | Re: Request Quote | | Re: Request Quote |
| | Body, fields + Attachment(s) | | EMAIL-B1 | EMAIL-B1 | | EMAIL-B1 |
| 1 | Subject | Request Quote | Request Quote | Request Quote | Request Quote | Request Quote |
| | Body, fields + Attachment(s) | EMAIL-A1 | EMAIL-A1 | EMAIL-A1 | EMAIL-A1 | EMAIL-A1 |

The email body with same label indicate duplication, that is same body, fields and attachments

Fig 11

An Embodiment to Create a Consolidated Email for an Email Package with Emails From Different Email Conversations

'Assign Labels' indicate the action of the present invention assigning label(s) unique or otherwise, that can be associated to email bodies, elements, attributes, data such as but not limited to, text, IDs (PID, SID), header, comparison data, attachment(s).
'Attribute Data' indicate the actual information that relate to, but not limited to, 'Assign Labels'
'System Storage' indicate but not limited to, a single or multiple tables, a single or multiple databases, active, and/or passive memory of email system vendor or customer (user) and inventive systems.
'Commit to Storage' indicate the action of storing 'Attribute Data' in 'System Storage'

For reference purposes,
- A body indicates one email message body within an email, with its associated attachments and all the related elements (attributes, field and data) applicable to that email body. It could be the first email or a Reply (RE) or a Forward (FW).
- An email conversation or a thread indicate emails that are Replies of Forward initiated by other email users that are part of the same original email conversation.

Explanation of the table
1. In the table below, two emails, EMAIL-A and EMAIL-B in column 3 and 4 are from same email conversation, meaning they are related to each other;
   with EMAIL-A being the original email and EMAIL-B being a Reply to it;
2. Two other emails, EMAIL-L and EMAIL-W in columns 5 and 6 other email conversations with different subjects and content, unrelated to EMAIL-A or EMAIL-B;
4. The table shows how the invention performs the consolidation, similar to the one described in Fig. 11:
   - The invention compares each email body with the email data that already exists in the database.
   - When a match is not found, it will store the email body in the database and link it to the originating email.
   - Upon finding a match, it will not store the email body in database but instead create a link to the matched email in the database; and
5. Column 7 shows the invention constructing an email consolidation or package that consists of each of the body from the original emails, EMAIL-A, EMAIL-B, EMAIL-L and EMAIL-W.

The invention can perform the following
1. Create a consolidated email without duplicating the bodies;
2. Create a consolidated email with duplicates;
3. Create a consolidated email with bodies out of sequence. For instance, it could contain only bodies EMAIL-L2, EMAIL-W2 and EMAIL-B1, or EMAIL-A1 and EMAIL-L3 or EMAIL-L1, EMAIL-W2, EMAIL-B1 and EMAIL-L3 and so on;
4. Associate a link to each email where it finds a body already to exist in the database;
5. Can construct the original emails from the database identical to emails such as EMAIL-A, EMAIL-B, EMAIL-L, EMAIL-W, with each containing multiple bodies like the original emails as they appear in columns 3,4,5 and 6;
6. Can construct a new consolidated email in any combination of emails and/or email bodies and their associated attachments. This could be a new email that is a combination of bodies from any emanating emails;
7. The packaged emails generated can contain all email bodies that made up each of the original emails and their associated attachments. This could comprise of duplicate bodies;
8. The packaged emails can contain any combination of any email bodies pulled in from other original emails, along with their related attachments. These can be duplicated, or can be out-of-sequence bodies from multiple original emails; and
9. Provide presentation of the reconstructed consolidated emails in any acceptable user interface format, or a reporting or a graphical format.

| 1 | 2 | 3 | 4 | 5 | 6 | 7 |
|---|---|---|---|---|---|---|
| Time Sequence | | Email content of 4 separate emails with different subjects | | | | Our storage method & consolidated email |
| | | EMAIL-A | EMAIL-B | EMAIL-L | EMAIL-W | |
| 7 | Subject / Body, fields + Attachment(s) | | | Re: Budget Review EMAIL-L3 | | Re: Budget Review EMAIL-L3 |
| 6 | Subject / Body, fields + Attachment(s) | | Re: Request Quote EMAIL-B1 | | 1107 | Re: Request Quote EMAIL-B1 |
| 5 | Subject / Body, fields + Attachment(s) | | | 1105 | Re: Meeting Time EMAIL-W2 | Re: Meeting Time EMAIL-W2 |
| 4 | Subject / Body, fields + Attachment(s) | | | Fw: Budget Review EMAIL-L2 | 1110 | Fw: Budget Review EMAIL-L2 |
| 3 | Subject / Body, fields + Attachment(s) | 1104 | 1106 | 1108 | Re: Meeting Time EMAIL-W1 | Re: Meeting Time EMAIL-W1 |
| 2 | Subject / Body, fields + Attachment(s) | Request Quote EMAIL-A1 | Request Quote EMAIL-A1 | 1109 | 1111 | Request Quote EMAIL-A1 |
| 1 | Subject / Body, fields + Attachment(s) | | | Budget Review EMAIL-L1 | | Budget Review EMAIL-L1 |

The email body with same label indicate duplication, that is same body, fields and attachments (Column markers: 1112, 1102, 1103, 1101)

Fig. 12

| An Embodiment of the Invention to Create Email Attachment Versioning and Cross-referencing Links |
|---|
| 'Assign Labels' indicate the action of the present invention assigning label(s) unique or otherwise, that can be associated to email bodies, elements, attributes, data such as but not limited to, text, IDs (PID, SID), header, comparison data, attachment(s). |
| 'Attribute Data' indicate the actual information that relate to, but not limited to, 'Assign Labels' |
| 'System Storage' indicate but not limited to, a single or multiple tables, a single or multiple databases, active, and/or passive memory of email system vendor or customer (user) and inventive systems. |
| 'Commit to Storage' indicate the action of storing 'Attribute Data' in 'System Storage' |

The invention can, but limited to,
1. assign identifiers to filename, timestamp, numeric serial number, etc;
2. assign, prefix and/or postfix filename(s) with version number for attachments with same filenames, same email conversation and/or same user-selected group of emails. Versioning can also be applied to any, some or all attachments;
3. cross-reference attachment to its originating email body, owning email and/or the consolidated email
4. can store attachments 'System Storage'; and
5. can store attachments in any location. This can be accessed by other systems or users.

Stored attachments and their cross-referencing original emails can be displayed in any acceptable user, system or presentation format. This could be performed by
1. user or client's own email system
2. Our system and/or user interface or presentation layer The attachments can be displayed in any presentation format. For example, they can
1. be sorted by size, name, date, timestamp, associated original emails, folders, serial number, version number etc;
2. be in the form of reports;
4. be downloaded or uploaded;
5. cross-reference attachments from the originating, originating email and its associated conversation emails, selective-grouped emails of same or different conversation and/or consolidated email(s); and
6. can be cross-referenced to the actual email body within the email (for example, it could be 3$^{rd}$ from top of the RE)

<u>An example of email attachment processing, storing, consolidation and display is listed below</u>
For illustration purposes, four source emails are displayed in the table below with their content; the email subject, the body and attachments.

| | Email attachments from 4 different emails | | | |
|---|---|---|---|---|
| | EMAIL-C | EMAIL-G | EMAIL-K | EMAIL-D |
| Subject | Fw: Request Quote | Fw: Purchasing | Re: Milestone Info | Re: Request Quote |
| Body, fields | EMAIL-C1 | EMAIL-G2 | EMAIL-K3 | EMAIL-D1 |
| Attachment(s) | Quote1.doc | Price_today.jpg | milestones.xls | Quote1.doc |
| | Quote2.pdf | | | |

The invention can parse and store the 'Attribute Data' of the above emails in the inventive systems and databases. the inventive method can present attachment(s) and their emails from which they originate in a cross-referencing format, such as one listed below, but not limited to. A link is maintained between each email and its attachment, and between each email and its related Replies. The details can be presented to the viewer in any standard or non-standard format such as a user interface, reports, audit trails and presented using other commercially available software tools and applications.

1201 →

| Our system can present cross-referencing information of attachments and its originating email, its date/timestamp, associated fields and attributes | | | |
|---|---|---|---|
| Attachment | Email | Subject | Date/Timestamp |
| Price_today.jpg | EMAIL-G2 | Fw: Purchasing | 12.13.06 11:35pm |
| Quote2.pdf (02) | EMAIL-D1 | Re: Request Quote | 3.27.06 2:20pm |
| milestones.xls | EMAIL-K3 | Re: Milestone Info | 5.18.04 11:35pm |
| Quote1.doc | EMAIL-C1 | Fw: Request Quote | 13.27.06 10.15pm |
| Quote2.pdf (01) | EMAIL-C1 | Fw: Request Quote | 13.27.06 10:15am |

In addition, but not limited to,
1. The invention can cross-reference attachments to their originating emails, and vice versa;
2. Email or group of emails can be selected, and the corresponding attachments can be obtained and viewed;
3. Attachment(s) can be selected, and the corresponding originating email(s) can be cross-referenced;
4. Date and/or time range can be selected, and all the emails and corresponding attachments can be cross-referenced;
5. Any standard criteria can be applied, such as subject(s), To, From, CC etc fields and the corresponding emails and their attachments can be cross-referenced;
6. All associated fields and information such as date, time, associated (same conversation) emails, To, From, CC, etc can be presented in a displayable format or data-pass-through format;
7. Item 1 to 5 also applies to all the emails that are reconstructed, consolidated or grouped;

Fig. 14

An Embodiment of the Invention to Create Email Relationships for Email Proliferation

Explanation of a typical email conversation Email-A that is proliferated to a number of other users.
1. Person1 toPerson8 can be senders and/or recipients of emails
2. All emails are part of the same conversion, that is, Email-A is the original email, and Email-B, Email-C and Email-D are Replies (RE) or Forward (FW) type Emails in chronological time order.
   - Person1 sends out Email-A to there recepients, person2, person3 and person4.
   - Person3 then sends a Reply (RE) Email-B to three recepients, person1, person2 and person5.
   - Person5 then sends a Reply (RE) Email-C to person1, person4 and person6
   - Person6 then sends a Forward (FW) to person7 and person8

Inventive System can, but not limited to,:
1. Associate each original email (e.g. Email-A) with its chain of Replies and Forwards (Email-B, Email-C, Email-D etc) through the inventions described in earlier figures;
   - The construction can link back each email and its chain, senders and recipients, displaying the complete proliferation, or the propagation of the email and its chains throughout the email systems.
   - provide the information in any number of ways to include, but not limited to, graphical topology mapping as displayed below, balloon boxes, tabular format as displayed in Fig. 19 under section 'eDetails' and 'eStats', standard and custom reports, third party and vendor provided reporting and statistical tools, user interfaces and spreadsheets.
   - Each email can have a link that when selected, will provide details (body) of the email and its content
   - Each email can have, but not limited to, a balloon type hover link displaying statistical details about that email, its sequence in the overall chain (that is, how many email were before, after) and other details.
   - Link and relationships will be maintained and displayed even if the email Subject is changed during proliferation.
2. Construct and provide proliferation information and relationships of emails across different email conversations, for example, an email may contain another email as an attachment that may be unrelated to the original email being sent. The proliferation method can provide details of the attached emails and their proliferation also;
3. Construct and provide proliferation information and relationships of emails that are part of a consolidated and/or packaged emails
4. Construct and provide proliferation information and relationships of emails that contain user-defined keywords and criteria.

Topological Map of Email Proliferation/Propagation

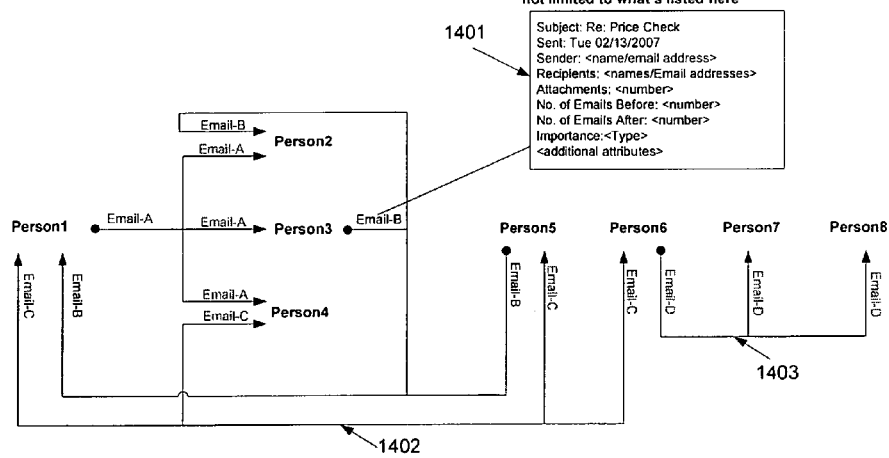

Fig. 18

An Embodiment of the Invention to Facilitate via a User Interface the Display of the Created Email Packages and Consolidated Emails

An example of email packages/consolidated emails that are interfaced with Microsoft Outlook
1. Packaged and consolidated emails appear inside the panel named Twigalook – eChain, that are invoked by selecting a sub-menu, Show eChain from Fig. 16.
2. The consolidated emails displayed in red are made up of the individual emails combined as one long email. The corresponding emails that make up the consolidated email are shown under each consolidated email. The consolidated email and its associated individual emails make up an email package.
3. The consolidated emails retain all email message bodies, including duplicates.
4. The second and fourth consolidated emails (or email packages) displayed are made up of emails from different email conversations.
5. Original emails that create the consolidated emails are not deleted.       1805

TwigaLook – eChain

| From | Subject | Received |
|---|---|---|
| aj2 | Begin: 11/14/2006 1:18:03 PM | End: 12/25/2006 3:02:22 PM |
| Miller, Rudy | RE: Case #12239 | 12/25/2006 3:02:22 PM |
| Meera, Raghvan | RE: Case #12239 | 11/15/2006 2:54:55 PM |
| Miller, Mike | RE: Case #12239 | 11/14/2006 1:18:03 PM |
| Ajay May 25 | Begin: 3:18/2006 4:04:49 PM | End: 4/20/2006 3:36:46 PM |
| Sanchez, Javier | Software Field Support Center | 4/20/2006 3:36:46 PM |
| Sanchez, Javier | Customer Quotes | 3/18/2006 4:04:49 PM |
| Case 566156 | Begin: 1/29/2005 5:23:25 PM | End: 3/18/2006 8:51:19 AM |
| Nagar, Ajay | RE: Case #566156 - Cause of Problem | 3/18/2006 8:51:19 AM |
| Shah, Sean | RE: Case #566156 - Cause of Problem | 1/29/2005 5:23:25 PM |
| Outlook Mails | Begin: 3/09/2006 9:19:57 AM | End: 3/17/2006 5:01:21 PM |
| Nagar, Ajay | RE: Case 566156 – MBB Case | 3/17/2006 5:01:21 PM |
| Shah, Raman | RE: Case 566156 – MBB Case | 3/12/2006 4:18:44 PM |
| James, John | RE: Case 566156 – MBB Case | 3/11/2006 10:45:29 AM |
| Vila, Jorge | RE: Case 566156 – MBB Case | 3/10/2006 10:35:25 AM |
| Shah, Raman | RE: This Issue is Now Resolved | 3/09/2006 9:19:57 AM |

Fig. 19

An Embodiment of the Invention to Facilitate the Searching, Attachment Linking, Display of an Email Package Email Content & Analytics An example of a user interface (UI) to facilitate the invention's functions by interfacing with Microsoft Outlook
1. The UI is presented by selecting a sub menu, Show eView from Fig. 16.
2. The top section, eList, provides the ability to search by user-defined keyword or criteria. It also provides a means to select stored attachments in box, File Selected. The associated originating email will appear in the section, eDetails.
3. The section, eDetails, displays the emails that make up the email package. It displays a consolidated email and the individual emails that make up the consolidated email. The corresponding email elements such as Folder List, From, To, CC and Attachments appear in the columns as displayed. The buttons, 'Stage Unchain' and 'Save UnChain' initiates the process to recreate the original emails from the consolidated email and save them.
4. The section, eStats, displays the analytical information related to interaction and action states of emails that are associated with the email package that are displayed in the above section, eDetails.

TwigaLook – eView  1901 eList

Search Type [ ▼ ]  Search Criteria [ ▼ ]  From/To/CC [All ▼]
Search String [            ]  1902

Date Range [Mon, Nov 27, 2006 ▼]   Files Selected   [Browse]
☐ ON or BEFORE                                      [FIND]
☐ AFTER  ☐ WITHIN                [Remove]         [CANCEL]

1904         1903              1905 eDetails

| Email Subject | Received | Folder List | From | To | CC | Attachments |
|---|---|---|---|---|---|---|
| | | | | | | |

[Stage UnChain]  [Save UnChain]  [Cancel Action]  [CLOSE]

1906 eStats

| Selected Email Summary | Complete Email Conversation (All Related) Summary | Summary of the First Email Type (Sent or Received) |
|---|---|---|
| Type (Sent or Received) Attachments Order of Emails from Beginning How Many Emails Before This How Many Emails After This | eChained Total Emails Total Received Total Sent Total FW Received    Sent Total RE Received    Sent Total Attachments | Sender Recipients Attachments Summary of the Last Email Type (Sent or Received) Sender Recipients Attachments |

An Embodiment of the Invention Processing Different Criteria for Historical and Future Trends of Emails

Some examples are listed here, but not limited to:

2001

| |
|---|
| Hourly, Daily, Weekly, Monthly, Yearly |
| Any Time and Date range that is selected by the viewer |
| Process, store and present email data statistics by individual persons (by name, email address an so forth) |
| Process, store and present email data statistics by departments (such as HR, Finance, IT etc) |
| Process, store and present email data statistics by individuals broken down by departments (such as HR, Finance, IT etc) |
| Process, store and present email data statistics by further granular level within departments, groups, directors, managers, leads and so forth |
| Process, store and present email data statistics by domain IDs as presented by the domain name as appears in the email address after the @ symbol (such as '@domain.zzz' where 'domain' can be a name of the company and 'zzz' can be the type of domain such as com, edu, org and so forth) |
| |
| Process, store and present email data statistics by further granular level such as sub-companies, departments, groups, directors, managers and so forth |
| |
| |
| |
| |

METHOD AND SYSTEM FOR HANDLING EMAIL

CROSS REFERENCE TO RELATED APPLICATIONS

This application claims the benefit of provisional application U.S. Ser. No. 60/902,472, filed on Feb. 21, 2007, which is hereby incorporated by reference in its entirety.

BACKGROUND OF THE INVENTION

1. Field of the Invention

This present invention pertains to computerized mail systems referred to as email and more particularly to a method and a system for handling email and making available valuable related information and content to benefit companies and individuals alike.

2. Description of the Related Art

Written communication over a network of computers, which is referred to as email, has become a very common form of communication, particularly since computers have become connected through corporate companies' internal and external networks and through the internet. Much of the volume of email is handled using Microsoft Outlook and Microsoft Exchange provided by Microsoft Corp. of Redmond, Wash., particularly for business communication, but IBM Lotus Notes and internet search engine companies such as Yahoo and Google also handle a considerable volume of email. Individual consumers also use services provided by companies such as America Online and Hotmail.

Effectively handling the volume of email that particularly a busy corporate employee gets is challenging in many aspects. Various patents and patent applications propose solutions for addressing various problems with email, such as a proliferation of junk advertising email, as well as to improve productivity either in computer systems through hardware performance efficiencies or of people handling their email through best practices approach. U.S. Pat. No. 7,155,481, issued to Prahlad et al. and incorporated by reference in its entirety for all purposes, is directed to Email attachment management in a computer system. Quoting its abstract, the Prahlad patent describes an "e-mail management system that includes an e-mail browser having a time variance interface that provides for storage into a storage media [and . . . ] provides for retrieval, from the storage media, of the e-mail messages corresponding to a user specified date [and . . . ] provides the user with an option of retrieving content of the attachment(s) from the storage media such that the content of the attachment (s) is retrieved by the e-mail browser only when specifically requested by the user."

A U.S. Pat. No. 7,328,251 filed by Ahmed and Alam et al, and incorporated by reference in its entirety for all purposes, is directed to email consolidation of all Replies into a single Email. Quoting its abstract, Ahmed and Alam describes his patent as 'messaging services to multiple users by storing a single copy of an electronic message at a central location and notifying recipients of the stored single copy . . . . A distribution list identifying multiple recipients'. Quoting its Summary and Objects of Invention, Ahmed and Alam describes his invention as "The host system stores as few as one copy of the electronic message, notifies each recipient of the stored message, and includes with the notification a link for accessing the stored message. Therefore, the host system saves both the processing time that would otherwise be used for duplicating and the corresponding storage space required to hold each of the duplicated messages."

A U.S. Pat. No. 7,296,058 filed by Throop et al, and incorporated by reference in its entirety for all purposes, is directed to storing the contents of email attachments in a graphics database. Quoting its abstract, the Throop patent describes "content is then extracted and automatically loaded to a graphics database . . . content is associated with certain business tasks to facilitate future use of the content within automated workflow processes. Content is preferably stored within the graphics database as one or more single page TIFF files to memorialize the content for later use with the workflow processes."

A U.S. Patent Application bearing Publication No. 20060143274, filed by Schulz et al. and incorporated by reference in its entirety for all purposes, is directed to email reply consolidation. Quoting its abstract, the Schulz patent application describes "grouping a set of emails into a set of conversations . . . ordering the emails of a conversation of the set of conversations based on a timecode of each of the emails . . . comparing emails within the conversation of the set of conversations to determine if emails of the conversation include other emails of the conversation . . . marking emails of the conversation as included responsive to the comparing" and deleting the marked emails.

Although email has been addressed extensively in the patent literature, problems remain in handling email and presenting critical information back to the viewers in a productive and legible method. In addition to various problems that individual consumers face, the corporate world still has problems in managing and maintaining their email-related business and operational functions. Problems include: difficulty or near impossibility to extract old emails quickly and legibly for internal use or for legal purposes; zero visibility of email proliferation and propagation that occurs in a practical environment when emails sent by one user to another can be sent to other users, without proper traceability or accountability; no means to have accountability-based knowledge of emails, their interactions and proliferations; lack of grouping, storing, archiving and quickly retrieving or obtaining multiple emails or groups of emails from different conversations (meaning emails with different Subjects that share pertinent and related contents based on either standards, policies or user defined criteria): lack of means for obtaining intelligent data or patterns from email communications that can present historical patterns and relationships and identify user trends or malicious activities; lack of means for manipulating existing data and historical patterns to derive future trends and forecasts; lack of deriving meaningful project-management related information such as attachment links back to the originating emails, most current updated attachments, attachment versioning to distinguish between updated copies and attachment sharing and updating ability by multiple users; lack of ability for dynamic grouping of active emails that are received within related confinement or projects to which they are associated; inability go package, maintain multiple disparate emails and their attachments and then obtain them quickly when needed; inability to create email relationships in a report or audit trail-type format; lack of means to efficiently migrate corporate and individual user emails from one email system to another such as, but not limited to, Lotus Notes to Microsoft Exchange, Microsoft Exchange to Google; and inability of an employer to extract meaningful email data in the event an employee user quits and leaves. Corporate businesses, legal and government entities are currently challenged by these and discovery or audit related enquiries that involve extensive searching of massive amounts of historical emails to retrieve pertinent information. These and other problems and challenges remain in handling email.

SUMMARY OF THE INVENTION

Other objects and advantages of the present invention will become apparent from the following descriptions, taken in connection with the accompanying drawings, wherein, by way of illustration and example, an embodiment of the present invention is disclosed.

The present invention provides a system to package emails into groups, or email packages, that include consolidated emails, according to user-defined keywords and criteria. Emails from different email conversations can be selected to create email packages. The emails can be selected manually by users, or automated through system and company administrative or operations policies.

The present invention can interface with any hosted or client-based email system. Emails from any email system such as Microsoft Exchange are stored in a database of the inventive system. The granular email elements of each email that comprise of its attributes, field elements and data are stored in the database tables. As the method intercepts newer emails, it first parse them into its email elements and compares them with the email elements that already exist in the database, storing only the non-matching elements while storing only the links of the matching elements. This prevents unnecessary storing of duplicate email bodies in the inventive system database.

The invention constructs email packages by retrieving email elements from the database and organizing the email message bodies to match the corresponding original emails to create a consolidated email. The consolidated email contains email message bodies in time-sequence order and also cross-references to their originating emails. The consolidated email, along with its corresponding original emails make up an email package. The email package can be managed as a modular entity, similar to a client portfolio. It is tracked and can be retrieved quickly from database. The invention provides means to view all the packages stored in the database.

The present invention additionally provides the means to identify emails through user-defined keywords and criteria (conditions), triggering links to the incoming emails that contain these keywords and criteria and storing them in the database for quick retrieval. A brief summary of the marked emails containing information such as "SUBJECT", "TO", "FROM", sent/received timestamps is presented to the user.

The attachments stored in the database are shared by multiple users and modifiable, with modified attachments versioned to distinguish them from previous iterations. The audit trail of the changes and the users are maintained in the inventive system. Additionally, when an attachment is modified, the system can send a notification to the email addresses that are part of the owning email.

The present invention derives email workgroups from the emails stored in the database. An email workgroup can be created for a project or a specific set of activities or a project, for example, "December Work Orders for Client X". The workgroup will associate all the related emails with it, tracking, maintaining and displaying the propagations and interaction states of these emails to any user who is either the sender or a recipient of the related emails. Another aspect is linking a name in the email message body with the email address in the TO, FROM or CC fields and flagging it to review the email content. Additionally, the inventive system will facilitate migration of the stored information from one email system to another.

The present invention maintains the interaction states of emails and its related email elements (such as "TO", "FROM", Attachments etc) and derives historical trends of the interaction activities and the future trending of emails for any specific time frame. The derived analytics are processed and made available for future trending and forecasting of the email load by departments, users and companies. Another aspect is that the analytics and the interaction states are relayed back to the respective users to allow them to be proactive in their management of their emails, replies and attachments.

The present invention constructs the propagation relationships between any email and its associated emails that propagate across multiple users. The proliferation of emails, their replies, forwards, attached files and attached emails can be linked by the invention. The invention can generate a complete mapping of all the emails to provide a topological understanding of the propagation. Additionally, the interaction states and all the related email elements allow each and every email to be related to each other, providing an end-to-end view of the proliferation with the ability to quickly display the content and attributes of the emails and their propagation paths.

BRIEF DESCRIPTION OF THE DRAWINGS

The accompanying drawings, which are included to provide further understanding of the invention and are incorporated in and constitute a part of this specification, illustrate embodiments of the invention. Understanding that these drawings depict only typical embodiments of the invention and are not therefore to be considered limiting of its scope. In the drawings FIG. 1 illustrates an embodiment of how email elements such as attributes, field elements and data are stored in database tables.

FIG. 2 illustrates an embodiment of how user-defined keywords and criteria are stored in database tables.

FIG. 3 illustrates an embodiment of the invention assigning labels to a single email with multiple email message bodies.

FIG. 10 illustrates an embodiment of the invention to create a consolidated email for an email package with email message bodies from a same email conversation.

FIG. 11 illustrates an embodiment of the invention to create a consolidated email for an email package with email message bodies from different email conversations.

FIG. 12 illustrates an embodiment of the invention to create email attachment versioning and cross-referencing links.

FIG. 14 illustrates an embodiment of the invention to create email relationships for email proliferation.

FIG. 18 illustrates an embodiment of the invention to facilitate via a user interface the display of the created email packages and consolidated emails.

FIG. 19 illustrates an embodiment of the invention to facilitate via a user interface the searching, attachment linking, display of an email package and analytics.

FIG. 20 illustrates an embodiment of the invention processing different criteria for historical and future trends of emails.

DETAILED DESCRIPTION OF THE EXEMPLARY EMBODIMENTS

Figure 4:
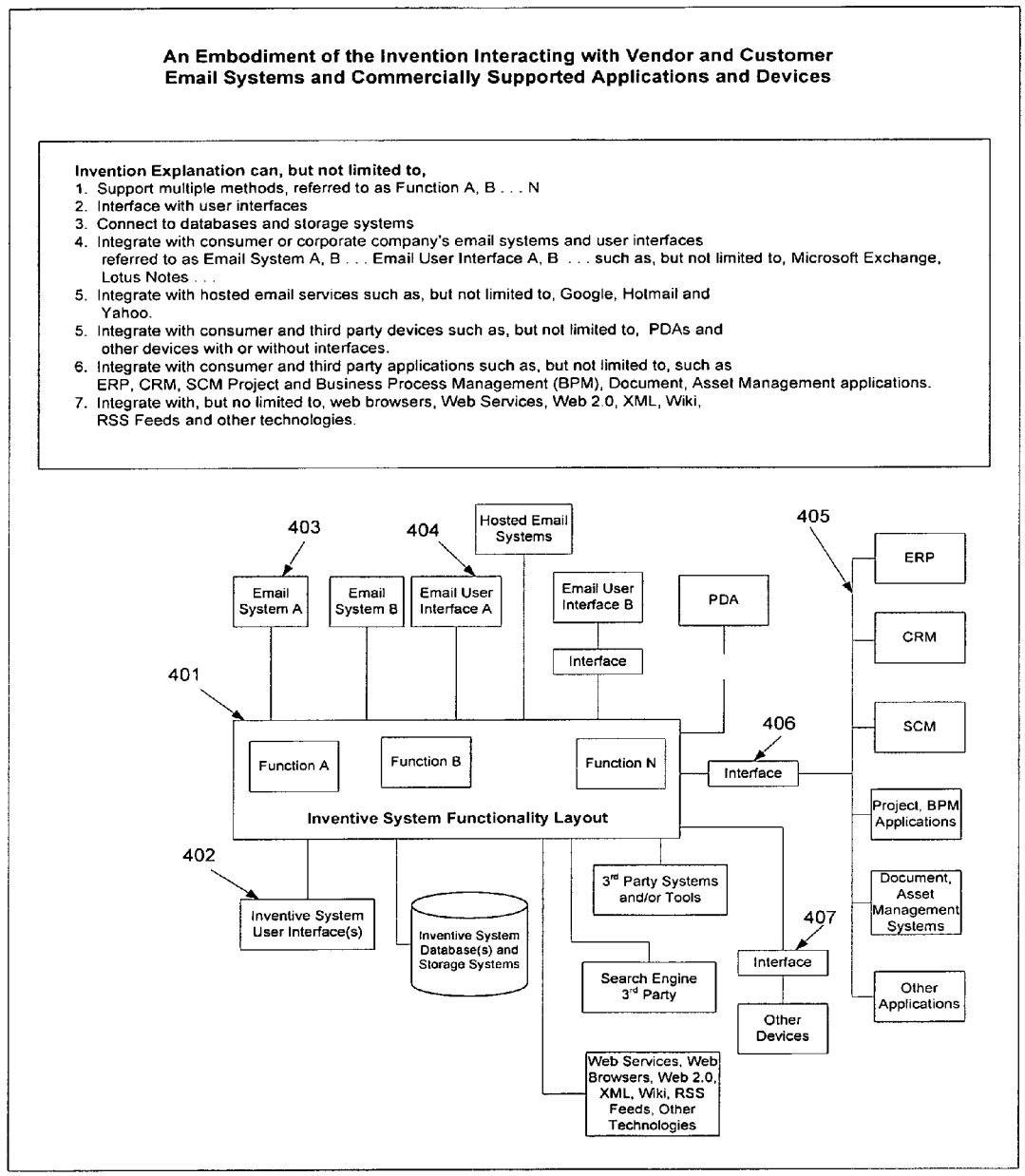
FIG. 4 illustrates an embodiment of the invention interacting with vendor and customer email systems and commercially supported applications and devices.

The present invention provides a method and a system for handling email. Without altering or deleting original email messages or attachments, email messages are analyzed and stored in a separate database tables 102, 202. The analysis includes parsing an email message into various components, which are stored in the database. Email components stored in the database can be retrieved and handled in a variety of ways that can improve the productivity of the individual user and can improve the overall efficiency of the user, the ability to obtain critical email-related information that is currently lacking and the overall efficiency of the email collaboration between individuals and within corporate and business areas alike that depend on the current computer systems tasked with handling email. The methods and system of the present invention are applicable to current email and to a historical collection of email messages for both corporate email systems as well as individual consumer email users such as web hosted services like Google, Yahoo and Hotmail.

The present invention provides a system, which can also mean multiple systems. In one embodiment the system of the present invention will incorporate a method, which can also mean multiple methods, according to the present invention. The system can include physical and/or logical components. Physical components mean the actual hardware, including servers, databases, storage systems, workstations, network connectivity and other devices that integrate with them. The logical components mean software, operating system, user interfaces, method architecture, programming code, programming and/or development tools, other applications, etc.

The methods of the present invention can be implemented as a combination of software that can be built in conjunction with other logical and/or physical components, and can operate in conjunction with other logical and/or physical components. The system of the present invention can contain one or many logical and/or physical components. The inventive system, which will facilitate the inventive methods 401 402, can integrate and function with other systems. These can be email systems provided by email vendors, customer systems 403 (systems that are used by customers using the email systems), users 404 (individuals using email facility) and/or other commercial vendors who are authorized to use the inventive methods and systems.

The methods can include several components, such as architectural bases, block components, graphical and non-graphical topologies and tables 102, 202, interfacing components (drivers, APIs etc), user interfaces (to present information to users), graphical depiction, batch interfacing for exchange of data, scheduling facility, interfaces with databases, sockets, data storage systems, networking systems, security systems, our agents, etc.

The inventive system can invoke an inventive method and/or integrate third-party search engines. The system (and/or in conjunction with other search engines) can perform parsing, storing and retrieval of emails, attachments and/or any of the fields, attributes, data or information. Standard search criteria as well as keywords, phrases, strings, paragraphs, email subjects, filenames, date/timestamp, to, from 101, 201 etc in any combination thereof can be used.

The system can have agents and functions 401, 402 that can be installed and/or run on email server systems 403 (e.g. Microsoft Exchange servers), user client sessions 404 (e.g. Microsoft Outlook) and/or other systems. The agents can run as processes, tasks, APIs, event-driven, listener etc. These agents perform multiple tasks including, but not limited to:

Track email data, fields, interactions, and other operations that are performed on the machine where the agents are installed;

Monitor status of interactions and data exchanges between the host system (where they reside) and other systems;

Exchange data, status, headers and other information between the host systems and our systems/methods;

Exchange data, status, headers and other information between the host systems and other systems that run the agents or any other systems that can integrate/interoperate with our agents;

Enable manipulation of email and other data on the host systems, user sessions and other systems as needed; and Execute smart tasks and algorithms to enable the required manipulation for user updates, user-session presentation layer (GUI) updates, system UI updates, reports, graphs and other non-intelligent and intelligent information presentation and displays.

In one embodiment of the invention, methods are provided that will capture older emails by transferring existing emails 501 from email systems into our systems. The methods will be applied to these emails, and they will be stored in the inventive systems accordingly. This will enable accountability and traceability of older emails. The methods can allow emails with different subjects and possibly belonging to different email conversations 1002, 1003, 1004, 1005, 1102, 1103 or threads 1104, 1105, 1106, 1107, 1108, 1109, 1110, 1111 to be grouped, stored and extracted, referred to as email packages 1001, 1101, 1903.

The system can periodically, say every 24 hours or 8 hours or hourly etc, transfer emails from email systems into the inventive system, which will process these newer emails and store them in the systems.

The system can extract emails via the agents directly from the user session (e.g. Microsoft Outlook session). These newer emails can go through the methods and be stored accordingly. Relevant emails, status, patterns 1906, etc can be displayed back to email users on their email sessions, email systems, an inventive system user interface 402, or any other third-party or proprietary system.

The methods can perform transfer or email data between email systems (which means customer systems that contain their emails) and the inventive systems (that is, the systems that facilitate the methods) through a number of ways including, but not limited to, batch, ETL, dynamic loading, triggering, event-driven and listener.

All actions described in the SYSTEM AGENT section can be implemented with or without an agent residing in the email server systems (e.g. Microsoft Exchange servers), user client sessions (e.g. Microsoft Outlook) and/or other systems. The data can be obtained from these systems through the inventive system invoking a means such as listener, a caller, or provided by the email system's interface 402, but not limited to, that goes out to these systems and extracts or collects the required data as needed and/or through a scheduling means.

Data elements of an email message are parsed and stored in database tables 102, 202. Data elements include, but are not limited to, the fields, body texts, attachments, and user-defined and/or system-provided keywords. An element can be stored in individual or combined tables. Additionally, an element can be stored in multiple tables. A table can have a reference to each (or multiple) stored entry (entries). Similar data elements from multiple emails can be stored in the same table. Further, the data elements could be stored across multiple databases. Types of entries 101 201 stored in database tables 102, 202 are illustrated in, but not limited to, FIG. 1 and FIG. 2.

Additionally, the system will store the following elements in database tables. The method will allow the ability for users to define keywords, phrases and criteria that will be stored in the database tables. The keywords can be specific words that can be stored in tables and be used to identify emails that contain them. Likewise, phrases can be a string of characters or a sequence of user-defined format stored in tables and can be used to identify emails that contain them. User-defined criteria or inventive system defined criteria can be a particular state of the email or the mode of its interaction (such as an x amount of time has passed with a Reply not yet sent for a Received email) that can be stored in tables.

The type of entries 201 are illustrated in, but not limited to, FIG. 2.

A database that can be used according to the present invention can be a commercially-available database, such as Microsoft SQL Server, Oracle, Access etc. The database can also be an embedded database such as Microsoft Exchange.

A digital signature 505, 602 or a combination of signatures can be generated to reduce the amount of body text and/or attachment contents that is used to compare with another similar body text or attachment content. Examples of suitable signatures include, but are not limited to:

1. Total character count; the number of total characters including spaces is obtained for each email's message body, its subject, attachment size, filename, type, timestamp. The counts can be individual or any combination of, and are linked to the email and stored in the inventive system and database. These counts can be compared 801, 802 to counts of another email. When a match 802 occurs either in part or as a whole, it could indicate that the two emails are identical.

2. Number of blank spaces: the total number of blank spaces is obtained for each email's message body, its subject and the filename of the attachments. The counts can be individual or any combination of, and are linked to the email and stored in the inventive system and database. These counts can be compared to counts of another email. When a match occurs either in part or as a whole, it could indicate that the two emails are identical.

3. Specific selected characters and/or strings; a specific range of characters is selected at various points within an email and its attachments. The first selection could be a string between character 1 and 10, the second one between 15 and 20, the third one between 40 and 47 and so on. The range can vary and can be obtained from different character locations within an email message and its attachment contents. These counts are stored in a database table in association with their originating emails. These can then be compared in whole or in parts with the counts from another email. A match in the count could indicate that the two emails are identical.

4. Random selection and verification of characters and/or strings; Random generator utility can be used to generate a range or data to compare.

5. Keywords; specific words from each email and its attachments are stored in the database tables. These words are compared with keywords obtained from another email and its attachments. A match of all keywords could indicate that the two emails are identical.

6. File size, type ID, extension type ID; the size of email attachments, the type of files they are (e.g. XML, HTML etc) and the extension of the files (DOC, XLS, PPT, PDF etc) are obtained from each email and stored in the database tables. These are compared with similar attributes of attachments from another email. A match in all these attributes could indicate that the two emails are identical.

7. Combination of any or all of the above; and

8. A unique sequence or Embedded ID associated with an email. Embed a string (could be randomly generated) or an Identifier (could be randomly generated) within emails with particular interest (such as sensitive content, words) or user preferences. When a match occurs during comparison method, that can indicated that emails being compared are related.

Examples of the unique aspects of the inventive methods and systems include, but are not limited to, 1. Original emails are not deleted.

2. Interface with user client session (e.g. Microsoft Outlook) to exchange data between the system using the inventive methods and user client session.

3. Interface with other email systems without deleting or changing their data or email structure on their system that can otherwise jeopardize their data integrity and security.

4. Allow transfer of data from other email systems into the inventive system(s) and apply inventive methods to the inventive system and email systems.

5. Parse and store relevant email fields, elements, attributes, textual content and attachment data 101, 201 into system database and tables 102, 202. The invention provides means for users to define keywords that are parsed and stored in the inventive or email systems when found in the emails. One can cross-reference any or all emails with the criteria that the users specify during search, including keywords.

6. The method deploys signature-based techniques to compare new emails with stored emails and identify emails that can be related and detect duplications in email subjects, bodies and attachments.

7. Allow selective and quick retrieval of old and archived emails or group of emails that are stored with the method's keywords and user defined criteria 1901.

8. Allow users or authorized individuals to create packages of emails that contain specific keywords, attachments, or any other elements, fields, attributes our system stores. These packages can contain original emails and/or consolidated emails. These emails can have different email subjects and contents and may belong to different conversations (meaning RE or FW) or threads.

Figure 13:
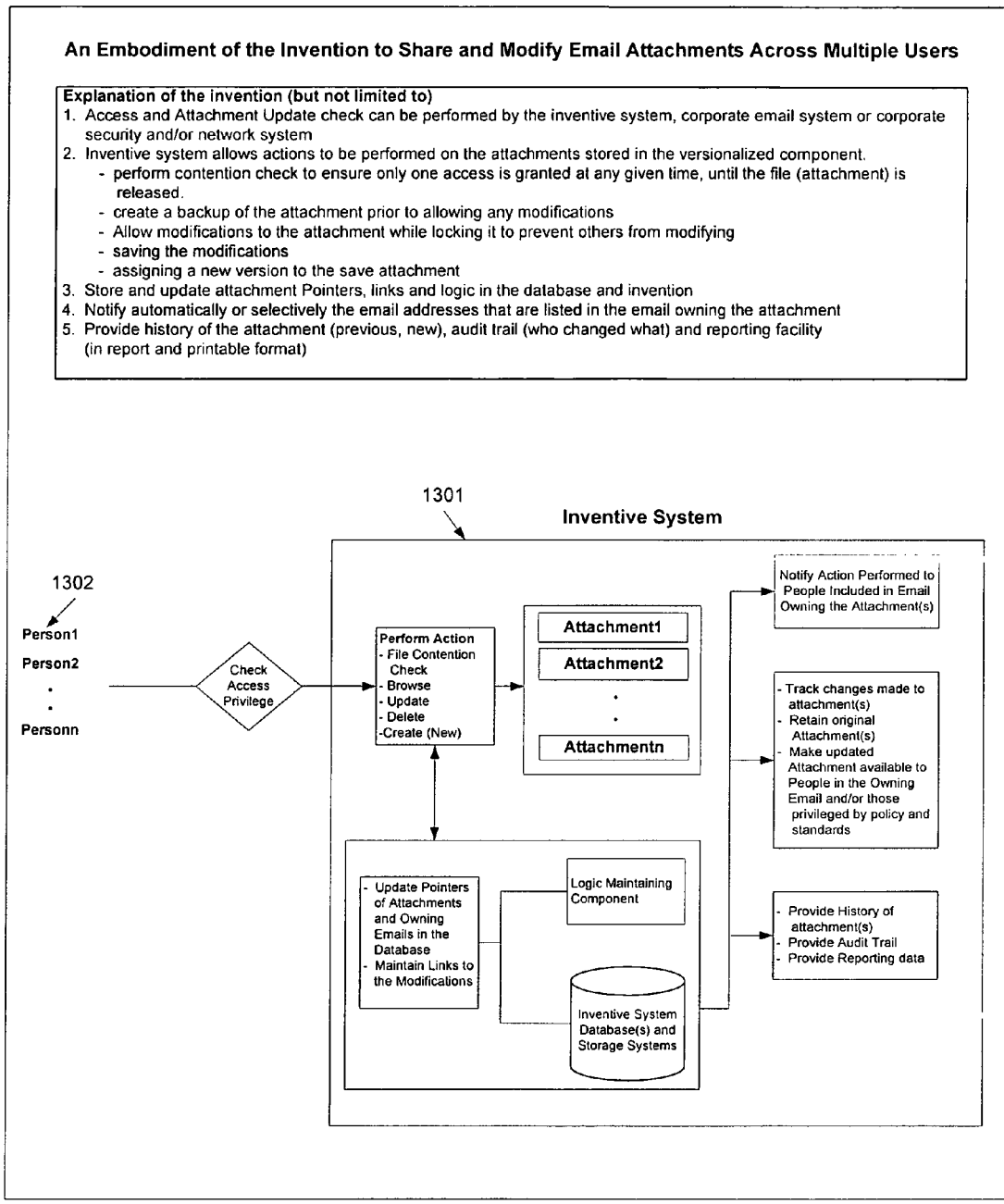
FIG. 13 illustrates an embodiment of the invention to share and modify email attachments across multiple users.

9. Allow email attachments to be stored in the system and they be presented to viewers in user-friendly formats and listing. Attachments originating from the same email conversation (meaning RE and FW) can be stored in versionalized methods 1201, meaning assigning version numbers to each attachment such as, but not limited to, 001, 002 prefixes to differential attachments that have same filename updated at different times. Multiple copies of the same file can be viewed in a versionalized listing to allow viewers to distinguish them from previous version. The presentation of these versionalized attachments can also include links to their original emails 1201, 1301, 1902, 1903, 1904, 1905 to allow viewers to easily relate any attachment to its original email and vice versa, as illustrated in FIG. 12, FIG. 13 and FIG. 19.

10. Allow attachments 1902 in the inventive or email system to be easily cross-referenced to their originating emails 1903, and allow retrieval of the emails 1904 and attachments 1905, as well as all the related emails and attachments. The method allows the extraction and linking of emails to their associated attachments, as illustrated in FIG. 12 and FIG. 13 for easy cross-referencing.

Figure 15:
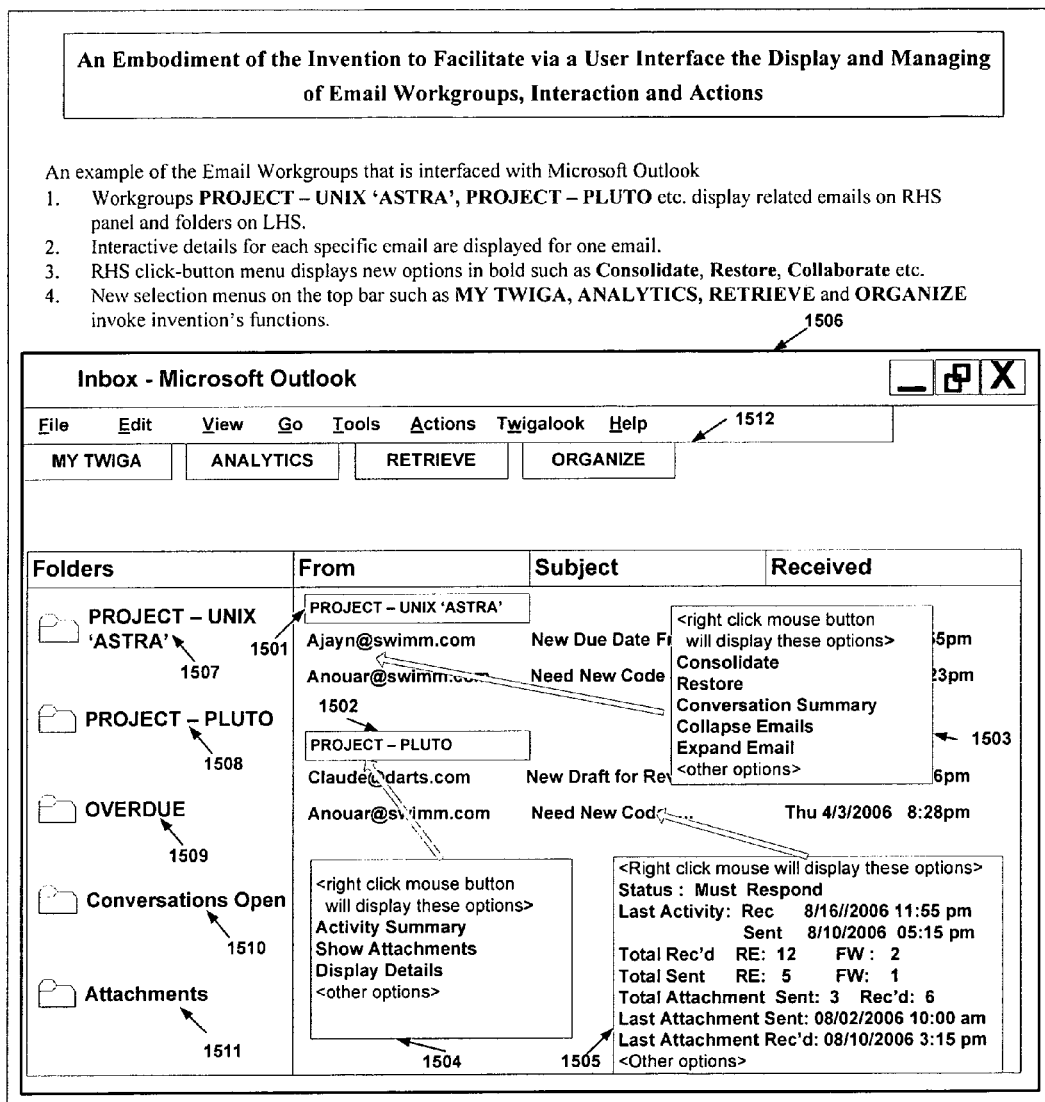
FIG. 15 illustrates an embodiment of the invention to facilitate via a user interface the display and managing of email workgroups, interaction and actions.

11. Allow the users to 'hide' clutter of REs and FWs on their email user interface (e.g. Microsoft Outlook). Original emails are not deleted. The hidden emails can be unhidden if the users choose to retrieve them, as illustrated in FIG. 15 by the menu option, "Collapse Emails" 1503.

12. Allow users the view of consolidated emails (the email packages) 1801, 1802, 1803, 1804 that represent the emails they 'hide' so all the relevant data is always viewable and present to the users as illustrated in FIG. 18.

13. Alleviate user's email interaction invisibility by providing means to have a smart assistant monitor, track and notify a user as needed the various state and status of emails. This includes states such as, but not limited to, 'email waiting to be replied', 'email due date' approaching and 'criticality' of email responses 1503, 1504, 1906 as illustrated in FIG. 15 and FIG. 19.

14. Alleviate user's email and interaction load by providing means of creating and enabling project or group-based email correspondence 1501, 1502, through creation of workgroups that enable all related emails to be grouped within an umbrella of a defined workgroup or category or class or subject or other defined criteria either by our system as programmed or provided by user.

15. Provide an end-to-end view of email proliferation 1401 within the email system as well as other email systems and/or applications outside of the core email system, along with all the pertinent information about the senders, receivers, time, attachments, body text, etc. This view can be in any format such as, but not limited to, graphical and textual as illustrated in FIG. 14.

16. Provide statistical, analytical 1504, 1505, 1906, and graphical 1401 results of email conversations, correspondence, interactions etc. as illustrated in FIG. 14, FIG. 15 and FIG. 19.

17. Interface with existing email system and/or user system to provide the enhancements from the present methods and/or systems.

18. Provide User Interface (a presentation layer) 1506, 1602, 1701, 1805, 1907 or interact with an existing User Interface that can provide and facilitate the enhancements as illustrated in FIG. 15 through FIG. 19.

18. Extract data from email vendor server systems into the present system as needed.

20. Provide audit and accountability based information about user's or users' email habits, patterns, historical trends and future projections 1504, 1505, 1904, 2001, 2101, 2201. This is described and illustrated in but are not limited to, FIG. 15, FIG. 19, FIG. 20, FIG. 21 and FIG. 22.

21. Make email data accessible to users in the event their primary email system becomes unavailable. Access to personal emails can be made available by inventive systems through existing email user interfaces or from the user interfaces of the inventive system, as illustrated in, but are not limited to, FIGS. 15 to 22. The present system will provide means to allow migration path of other email systems to be able to interface with data or provide a facility if data is needed independent of the email system. The present invention provides options to the users to be able to change or use multiple email vendors/systems and still maintain email and provide data availability to various email systems. Emails from one vendor system can be migrated using the inventive methods to another vendor system.

22. The method can allow users to have access to their emails in the event their email system become unavailable.

23. The system can provide commercial modules and/or interfaces that can integrate with other applications and/or email systems. Email information, data and the details maintained through the present method can be exchanged 406, 407 with these other applications and/or systems, provided they are allowed to do so. Data from these applications and systems can be shared with the present system and can be processed by the present methods.

24. The system can provide flexibility or configuration features that can provide means or methods to access the data arranged, managed or configured by our system for methods or means that interface with project or other management tools or various software or software elements.

25. The system can provide an independent email type of system using the same data and messages that are in the original email system.

If a user selects more than one email and invokes a 'consolidation' then one of the following approach can be applied:

1. Selected emails can be moved into a cache, hold space, or any other storage/system area where a comparison 701 of elements, fields, text, attachments, names etc. will be performed. If a match occurs, then an association (or a link) 702 between the two emails will be made. This could indicate that the emails are part of same original conversation, (e.g. RE's) or they have the same user (to/from/cc) pattern, or contain similar keywords.

2. Selected emails can be moved into a cache or hold space, and then directly compared with the existing email data stored in the present database.

3. Combination of both approaches.

Once a common pattern or a link is established, the emails can be stored as they are in the system database, or the emails can be consolidated and stored in the system database.

Aspects, features and functions of the invention include, but are not limited to, 1. Extraction 1901 of a group of emails 1904 based on user-defined or user-selected keyword(s), phrase(s), criteria or specification(s). These emails can be part of the same original conversation 1801, 1803 or across multiple conversations 1802, 1804.

2. Extraction of attachments, cross-referencing their original emails, and vice versa.

3. Extraction of all emails that would have proliferated into A user's environment, say A sends to B & C, B sends to D & E and so on. One can extract all associated emails, along with the links between them. This can be done by graphical and non-graphical approach. A topology view of the total proliferation 1402, 1403 can be obtained and presented. All status, interaction information as well as the actual data (email text bodies and attachments) 1401 can be tracked, maintained, manipulated and/or presented.

4. Sorting of attachments with same name and possibly from the same email conversation to allow viewer to distinguish between previous and current version of attachments. One can assign 'versioning.'

5. One can enumerate emails, and their associated RE's, FW's, Attachment's with linkable ID's can be cross-referenced from any other document (e.g. XML or http format).

6. The system can allow sharing of attachments between users, without the need to email (send, receive) attachments via emails. This can include the ability to update attachments as well as provide all available navigational functions like rename, delete, etc.

7. One can reduce cluttering of emails on user presentation layer (for example, Microsoft Outlook) by allowing user to 'hide' emails that he does not want. These emails are not deleted from the system, but simply are made transparent so they do not appear on user's interface layer.

8. One can obtain a consolidated view of groups of emails 1801, 1802, 1803, 1804. This can be presented to the individual user's session or through the present system's user interface, or through any other system's user interface.

9. One can provide upload and download capability to send packages of emails (groups of emails) that are consolidated by the system, and/or are selected by the user, and/or are extracted from the present system or the user's system based on search criteria and/or keywords.

10. Reports can be provided for a package of emails (groups of emails) that are consolidated by the system, and/or are selected by the user, and/or are extracted from the present system or the user's system based on the search criteria and/or keywords.

11. The report format can be tabular, textual and/or graphical.

12. Searching capability 1901 is enhanced to allow users to specify user-defined or system-defined keywords and to search for historical emails containing those specific keywords in any combination. The keywords are cross-referenced with the original attributes of the emails so they can be retrieved quickly. The search facility will also support standard search parameters such as date/time range, subject/text, and the others supported by the email system.

13. One can search and cross-reference attachments 1902 with their original emails. One can then further extract all related emails and/or attachments.

14. A user can be notified of newer Replies if he opens an email that has a newer RE or FW in his inbox or email system.

15. Users have the ability to mark emails, attachments, documents, notes etc as private or public. Making it private can prevent others from accessing (viewing, updating, etc). Making it public can allow these items to be viewed by everyone (if global public is enabled), or those who are selectively added to have access to them.

16. Existing emails can be transferred into the present system from an existing email system and perform any or all of the tasks described herein, such as email element breakdown, storing, consolidation, extraction, packaging, reporting etc.

17. The inventive system can have an inventive counterpart interface (commonly known as agents) that can reside in vendor email systems as well as in the present system. The agents will facilitate the data exchange between systems and amongst systems.

18. Hierarchical details 1903 and/or topological views of emails are available. This can be related to email movement between various senders and receivers, between various domains and/or extensions. It can also be associated with attachments.

19. Since the present system will hold all email data, if the users' email server or system experiences an outage, the present system can act as a backup, making emails available to users from the present system.

20. Users can create workgroup 1501, 1502 of emails. The workgroup concept allows various ongoing interactions and conversations to remain within a single or multiple method-created or user-selected umbrella(s) for manageability purposes. Workgroups can be created for various projects, departments, clientele 1506, etc.

a. Users can assign a workgroup name (such as relates to a project).

b. All emails created with this assignment will then be associated to the workgroup with the given name.

c. Emails can be contained and presented by workgroups on user's email session.

d. Workgroups can be created, modified, deleted, sorted, renamed, etc.

e. Emails within a workgroup can be moved back out of the workgroup, moved into another workgroup, deleted, replied to, forwarded, etc.

f. Workgroup-based emails sent to receivers can allow the receiver to create similar workgroup at his end.

g. Workgroups can be given alias names 1507, 1508, and they can have email folders with similar names.

h. Emails that appear under workgroups can also be visible via their counterpart email folders i. The functions to manipulate emails can be installed in a user's email session. An example is provided below in the Email Workgroup layout.

j. Workgroups and their counterpart email inboxes can be color coded. The color code may represent severity, priority, urgency, etc.

k. Email summary and attribute information 1504, 1505 can be presented for each workgroup, email, consolidated email etc. One example is the balloon-type box 1505.

l. Email folders can also depict urgency and action-related folders, such as OVERDUE 1509, MUST RESPOND 1510, ATTACHMENTS 1511 each of which contain a shortcut, or a link to the emails marked as such. Folder ATTACHMENTS can contain a listing of all folders for a particular user.

m. The system's user interface can present all the above details and data by specific users or by groups, workgroups, or by any combination thereof. Appropriate security and authority can be built into our user interface to prevent unwarranted access and grant access only those who are authorized.

21. The system can provide a smart view of the health, status and various link information 1906 of email. This includes the active or passive state, no activity, very active, last interaction state, etc.

22. A mechanism (e.g. a 'Smart Assistant') is provided that can perform a number of intelligent actions. One can implement several states (which can be referred to as WATCHDOGS) that can govern the complete lifecycle of emails from the time they are created, interactions performed, RE, FW's generated, and to the point where they allow users to apply a CLOSURE to the conversation of the emails. Automated response-Tracking and Proactive Notification of email status to users is provided.

23. Means are provided to maintain personal notes and reminders within emails.

24. Means are provided to track actions, interactions performed by the user. This can be recorded and presented to the users. Security mechanisms can be built in to prevent unwarranted access and to allow access to only those who are authorized to access this information.

25. Sent emails (for example, those that may reside in the 'sent folder' of emails) can be linked to the primary email to which the reply was generated. This link can provide easy and direct access to the 'sent email' from the primary inbox without having to manually go the folder that retains the 'sent emails.'

26. Multiple short-cuts (or links) of any email can be created and stored. These links can be stored in different email folders, while they all point to the original email. These folders can be created by users or email system or can be defined and/or enabled by the present system.

27. Quick retrieval of old emails is facilitated. One can generate packages of emails that all contain related criteria specified by the user during the search initiation process 1901. These emails can be from the same email conversation of from different conversations. They can include attachments. One can also generate a consolidated package that does not contain duplications. The packages of emails can be labeled, moved around to email folders or system folders, downloaded, printed and/or appended to contain user information. The packages can contain statistical, intelligent, graphical reports and/or information that the user wants to present and store.

28. Users can consolidate 1701 preferred emails at a corporate, group of users (or departments) or individual user level.

29. Different types of consolidations are provided to users, such as ad hoc or scheduled. Consolidations can be performed for all emails, or all except for the last 2 or last n.

30. Because all relevant fields and elements of email messages are stored in the system, analytical data in either statistical or graphical form can be presented. A complete anatomy of emails and their interactions can be developed including, but not limited to:

a. All statistics related to any given group of emails (either from the same conversation or different conversations), such as how many emails were exchanged between any given sender and receiver, start, end timestamps, total emails, current status (in send or receive mode), attachments exchanged, sent, received, etc.

b. The same statistics as above on consolidated emails.

c. Patterns and statistics 2101 of Sender or Receiver to include frequency of sending emails, recipients, time durations, peak times, averages, historical trends, and future projections.

d. Patterns and statistics of Sender or Receiver to include how emails are proliferated through email systems, and who is sending to whom.

e. All emails based on a particular email name, domain and/or extension 2201. For example, the format of a typical email address is emailname@domain.ext, (such as ajaynagar@mailzone.com). One can display all emails related to emailname or domain or ext. One can extract and/or display past interaction statistics, such as the volume of emails sent to emailname, domain and/or ext. The data can be displayed in a report format, graphical format and/or statistical format.

f. A complete picture of governance of email (Email Governance) to explain the current status of given emails, of any user, of the patterns of communications, of the contents sent/received, and of email proliferation.

g. Independent of the email owner, one can allow an authorized person to extract all the above mentioned statistics, patterns, historical trends and future projections of any or all users using an email system.

h. One can present summary and attribute details 1906 for emails, email packages and/or consolidated emails.

31. One can facilitate speedy migration of emails from one version to another version of an email software or from one email system to another email system or platform.

32. One can manipulate emails to process and provide analytical, quantifiable and measurable data on every aspect of interaction, groupings, sender/recipient interaction relationship, email proliferation between various senders and receivers, etc.

33. One can provide and maintain audit and accountability-related information of users. This can be based on individual users, groups of users, departments, a whole corporation or entity or any other combination.

34. One can provide users (or whoever is authorized) the most-current, up-to-date information about their emails, interactions, collaborations, correspondence, what is due, what is overdue, etc. This can be done through the means of notification, color-code highlighting, reminders, etc.

35. Graphical, statistical and/or reporting depictions of analytical information is provided, as well as variations of topological, hierarchical and/or peer-to-peer details.

36. Software and hardware according to the present invention can collaborate with an existing email system 403 and with non-email based applications 405 including, but not limited to, Enterprise Resource Planning (ERP), Supply Chain Management (SAP), Customer Relationship Management (CRM), document-management, financials, banking, insurance and other commercial or custom-built applications.

37. One can transfer user email and system data between a user's email system, the present system and third-party devices such as PDAs (personal digital assistants sold under brand names such as Blackberry and Palm Pilot), cellular telephones, pagers, etc.

38. Means to comply with country-specific and international regulations and requirements are provided.

39. Compatibility with email systems, user systems and/or other components such as operating systems, databases, etc. can be provided and maintained.

40. Means for security to ensure safeguarding of user data, email system data and inventive system data are provided. User authentication means allow authorized users access to any or all data. The security system can be inbuilt or can integrate with third-party security systems.

41. A licensing mechanism to govern the number of users (active and/or passive) that are allowed to use the system is available. The license mechanism can be inbuilt or can integrate third-party-provided licensing systems.

42. Software and hardware according to the present invention allows a corporation or other entity to obtain a complete '360-degree-view' 1906 of a user's emails, interactions 1505, current states, etc., without the user's intervention. Total autonomous access, intelligent-manipulation and total view of the health of users' emails is provided. This can be useful in situations such as where an employee has left a company, or where a corporation is investigating malicious email activities involving users. The present system, through a combination of other features mentioned above, can provide in-depth analysis, data, email access, current state, etc.

43. A backup email system is provided because a user can access emails in the inventive system if the primary email system (e.g. Microsoft Exchange server) is not in operation, which can be due to a failure, an outage or any other reason.

44. While the present system does not alter or delete original email, a user or a system administrator can choose to delete original email and rely on the inventive email-component database from which one can retrieve email components and rebuild an email as it was originally.

DESCRIPTION OF AN EMBODIMENT OF THE INVENTION WITH REFERENCE TO THE DRAWINGS

FIGS. 1 through 22 are just some of the many options that can be deployed to implement the methods and systems of the present invention. In addition, the methods can adapt any public-domain available or other commercially-available industry-standard approaches. The methods can be integrated with methods, systems and/or applications supplied by third-party vendors.

FIG. 1 illustrates an example of email elements that make up the complete email that are stored in the database tables. The elements can consist of email attributes, fields and data and comprise of, but not limited to, TO, CC, EMAIL SUBJECT, sent and received timestamps, email message body and attachments. The elements can be parsed and each element stored in a database table 102. Elements can be stored in a single or multiple tables across a single or multiple databases.

FIG. 2 illustrates an example of email elements that consists of user-defined keywords and criteria 201. The keywords and criteria are parsed and can be stored in a single or multiple tables across a single or multiple databases.

FIG. 3 illustrates the assignment of identifiers to link all the elements of an email such as attributes, fields and data, that make up the email and its embedded email message bodies. The assignment consists of a primary identifier, secondary and sub-secondary identifiers 301. The primary identifier is assigned to a parent email. The secondary and sub-secondary identifiers are assigned to the email elements and sub-email elements of the primary email to maintain the hierarchical relationships.

FIG. 4 shows one possible email management architecture according to the present invention. Hardware and software in the architecture is connected to and synchronized with an existing email system, such as Email System A 403. Using the System User Interface, one can perform various functions described herein. One can connect the system to other software, hardware and applications through various interfaces 406, 407. The hardware and software in the architecture can be located onsite with the existing email system or can be remotely located, where the system can be run in-house for an entity that owns the existing email system, or the system can be run by a third party.

Figure 5:
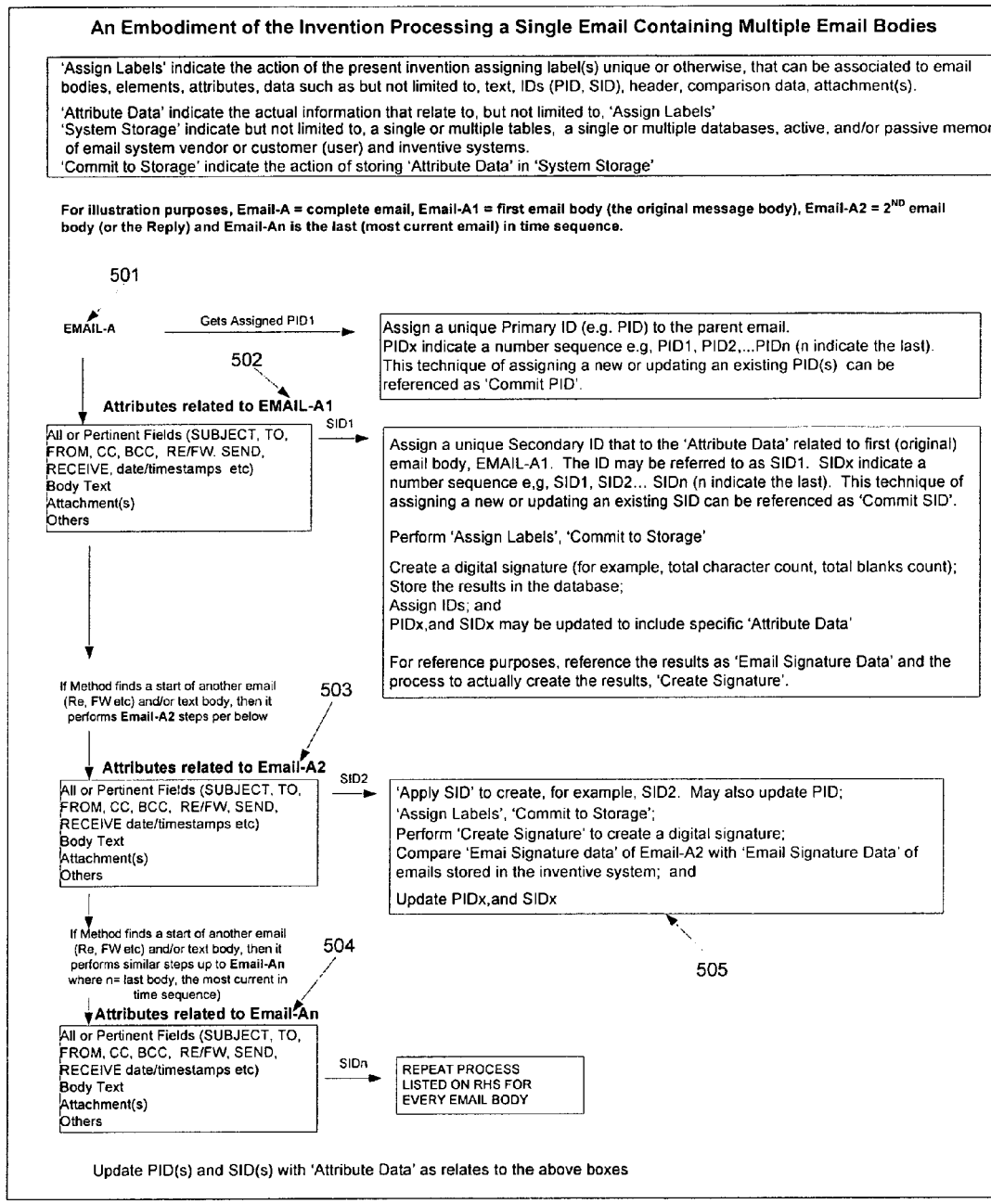
FIG. 5 illustrates an embodiment of the invention processing a single email containing multiple email message bodies.

FIG. 5 provides a flowchart describing how a single email 501, which may one or more email bodies 502, 503, 504, is processed. Email-A 501 is imported into the system, where it is assigned an identifying number or code called a PID. Email-A is parsed into its various components and stored as records in a database. Each email message, either historical email in an old system or current email in an existing system, is similarly given a PID, parsed and stored in the database.

Figure 6:
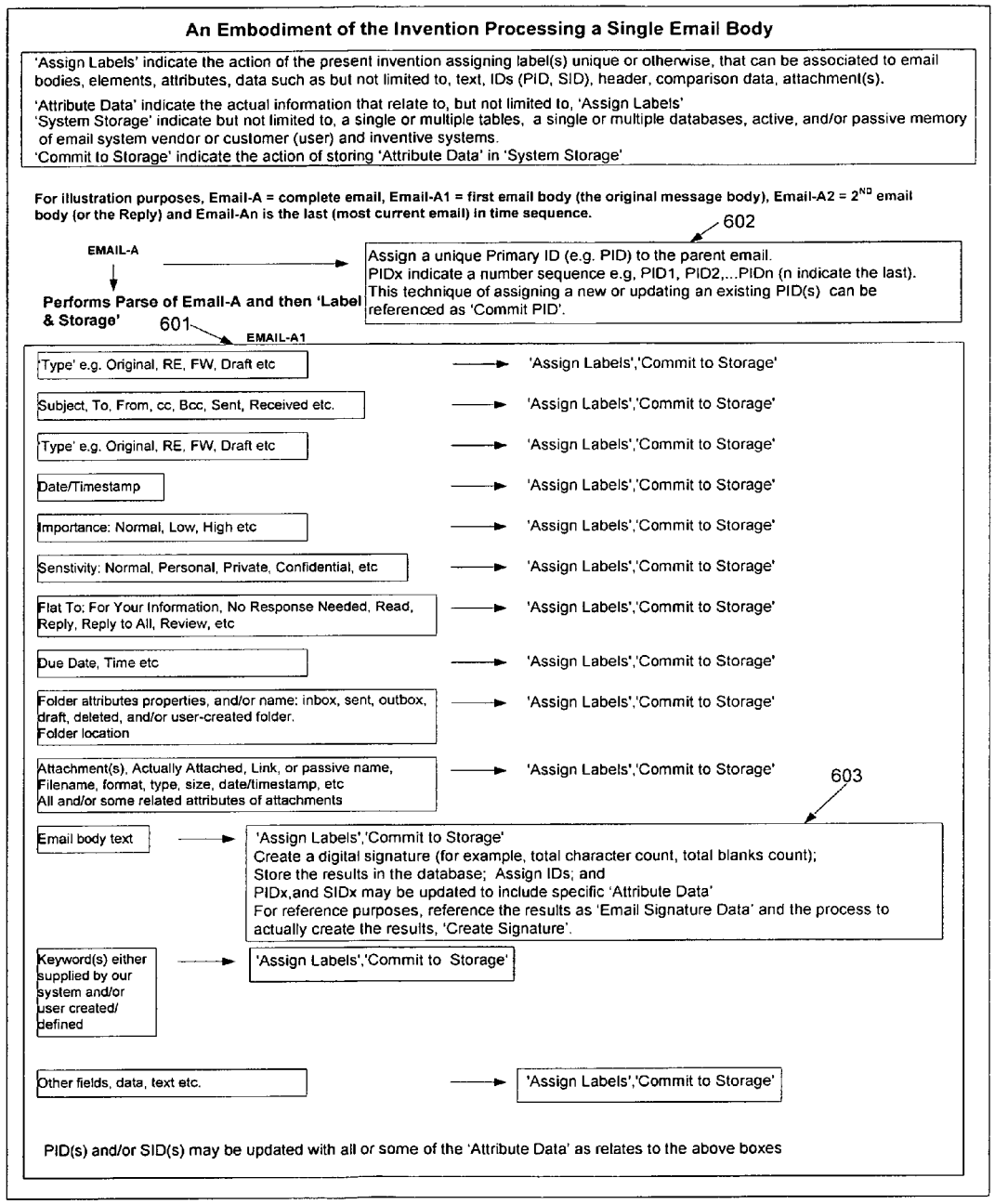
FIG. 6 illustrates an embodiment of the invention processing a single email message body.

FIG. 6 provides a flowchart describing how Email-A 501 (FIG. 5) is processed. Email-A is assigned its identifying PID 602 and parsed into components that are stored as separate and individual elements in a record of the system's database. The processing includes determining whether Email-A is an original email, a reply email or a forwarded email. Components such as the "From" and "To" field entries and the timestamp are stored as elements in the database for the PID of Email-A. Elements of Email bodies 601 are also parsed and stored 603.

Figure 7:
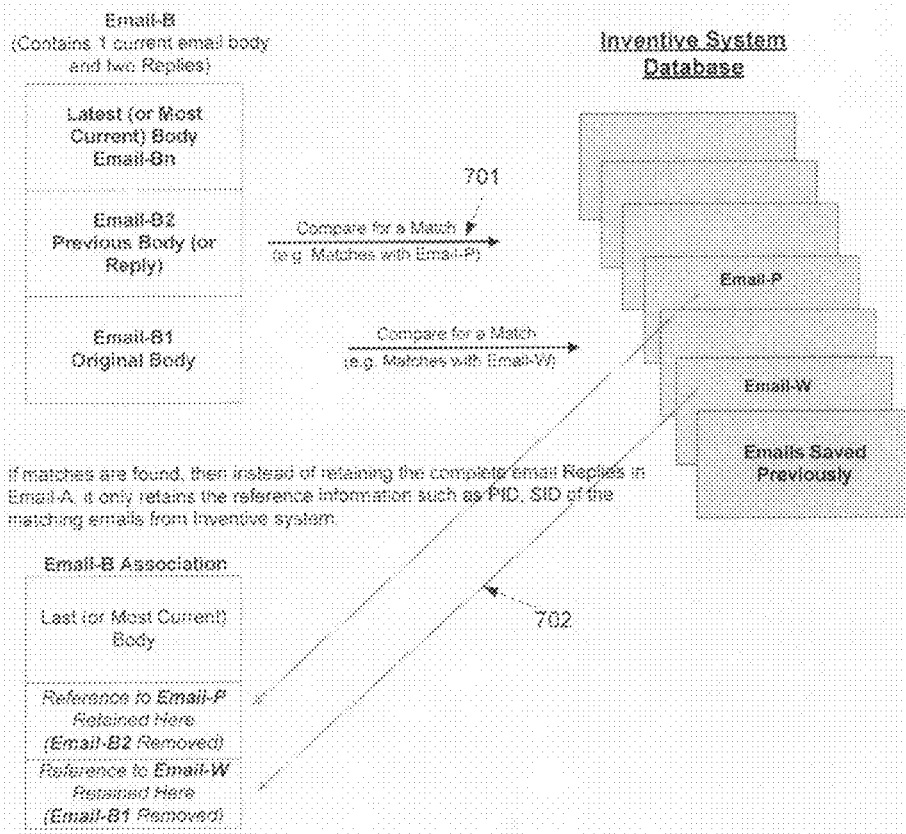
FIG. 7 illustrates an embodiment of the invention comparing and associating (linking) emails.
Figure 8:
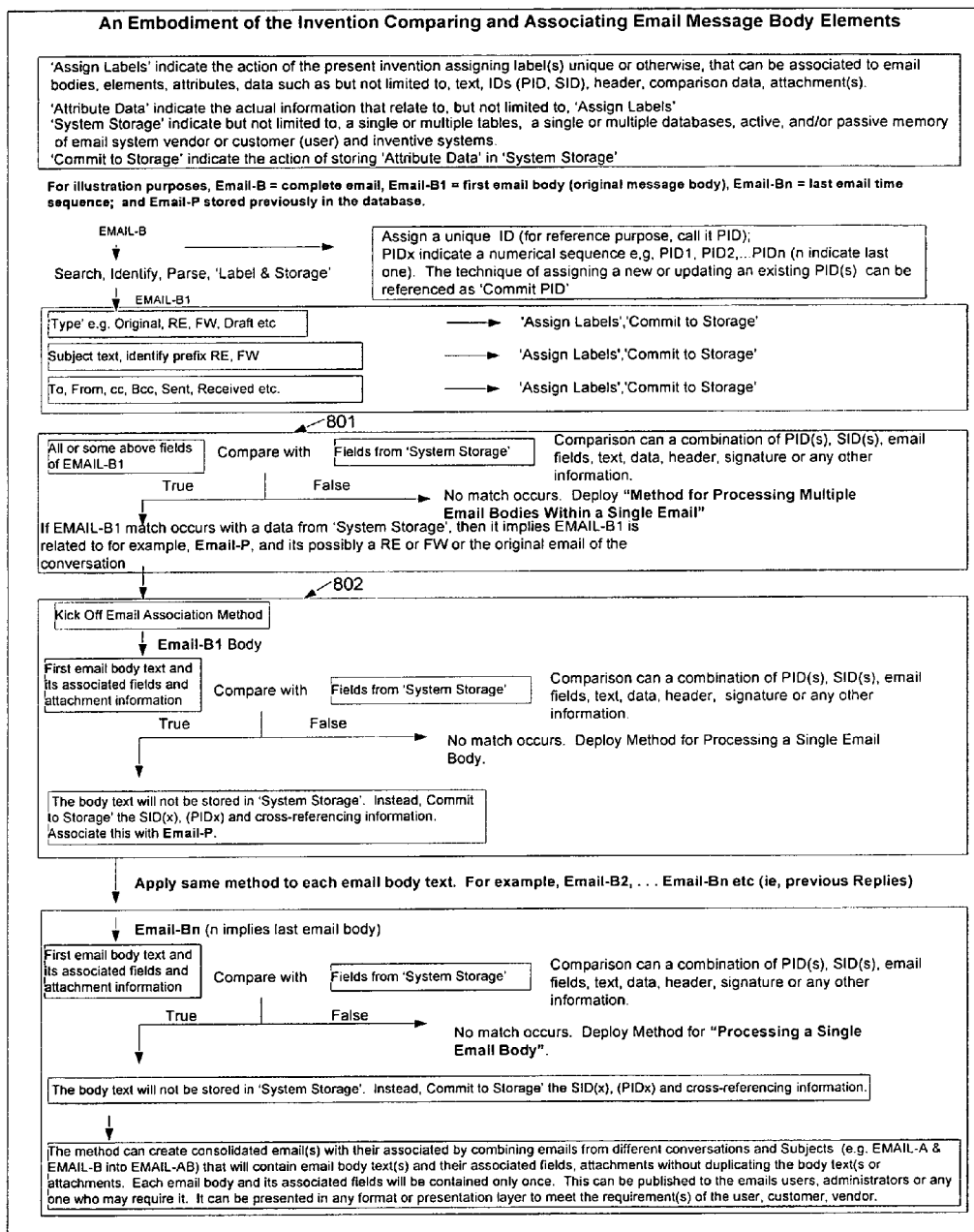
FIG. 8 illustrates an embodiment of the invention comparing and associating email message body elements.

FIG. 7 and FIG. 8 describe a method for associating one email with another email that is related, such as associating an original email with a reply to the original email. As an email is processed 602, 601 (FIG. 6), identifying characteristics of the email can be noted, which may be a random portion of the text of the body of the email, a word count, a line count, keywords or anything else that can be used to identify the contents on an email message. In FIG. 7 a new email is compared 701 to email that has been processed and stored in the system database. One purpose of the comparison is to identify related email messages such as a reply to an original email. When a match occurs, a cross-reference link 702 is maintained and stored in the system database instead of storing a duplicate email. The method further illustrated in FIG. 8. Fields such as "Subject" and "From" can be compared 801, and the identifying characteristics of two emails can be compared. The comparison may find that the new email is a reply to an original email, and the new email may contain the body text of the original email 802. If the new email contains the body text of the original email, there is no need to again store the original body text. Instead, an association can be made between the new email and the old email. The new email can be reconstructed using text from the original email.

Figure 9:
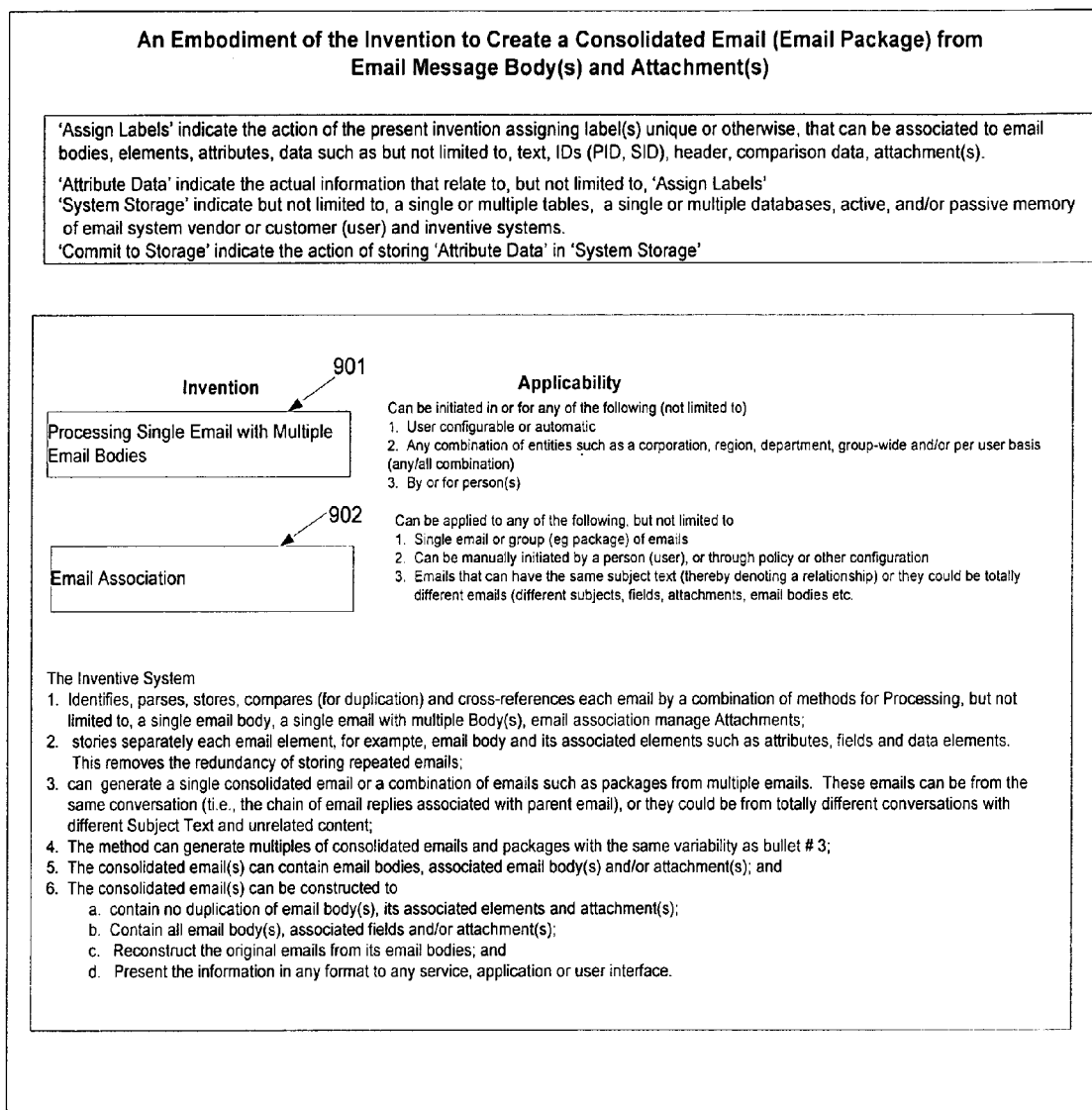
FIG. 9 illustrates an embodiment of the invention to create a consolidated email (email package) from email message body(s) and attachments(s).

FIG. 9 describes a method for managing single or multiple emails and attachments. In the comparison in FIG. 7 and FIG. 8, if two emails contain the same attachment, only one copy of the attachment needs to be stored in the database along with a pointer to the attachment. Comparison of emails can be configured in a number of ways, which can be done by individual users or on a basis for a group of users or throughout an existing email system.

FIG. 10 and FIG. 11 describe a method for creating a consolidated email, combining different emails 1002, 1003, 1004, 1005, 1102, 1103 and their email bodies and attachments 1104, 1105, 1106, 1107, 1108, 1109, 1110, 1111 into a single constructed email 1001, 1101. A consolidated email can be assembled from elements in the inventive system database. For example, an original email may be authored by user 1 and commented on by replies from user2 and user3. There may be a back and forth of additional emails on the same subject between user 1, user2 and user3. All of these related emails can be combined into a single consolidated email 1001, 1101, which may retain all the original text and headers that may be helpful for audit and investigation purposes; or omit duplicate text and headers that are unnecessary, such as repetition of the same subject field for each message. This can be particularly helpful where user1, user2 and user3 are working on a project for which user4 is a project manager, as user4 may wish to only see a single consolidated email at the end of the day or at the end of the email discussion.

FIG. 12 describes a method for attachment storing, versioning, and cross-referencing 1201. Common attachments to emails can be stored as a single element in the system database to eliminate storing duplicate attachments. Attachments can be compared using the same or similar methods as are used to compare emails. Attachments can be analyzed and retrieved in a variety of ways.

FIG. 13 describes a method 1301 for sharing email attachments across multiple users. The attachments can be made available to users who would have appropriate access privileges. Users can have the ability to browse, modify or delete attachments based on the granted privilege. The method can provide the capability to track changes, audit history and report back all the interaction and collaboration information through user interfaces of the inventive, or email or any other third-party system or application tools. This can be very helpful in reducing unnecessary transmitting of the modified attachments to the email recipients.

FIG. 14 describes a method to track and generate an end-to-end mapping of email as the email is propagated (or proliferates) from one email user to another. It tracks all the new email threads of REs and FWs that are created and transmitted 1401, 1402 across multiple users. The email threads can be of the same email conversation or different. The method provides all pertinent information 1401 of the originating email and its links to other emails and thread that have proliferated. This information can be presented in any number of formats such as textual, graphical, analytical, topological, tabular, reporting and audit trail based. This is very helpful when for investigation purposes when an investigator or a legal department authority may want to identify the history of propagation path for any email in relation to other emails across multiple users.

FIG. 15 provides a screen print of one embodiment of the invention in which an email workgroup and a smart assistant that processes email interaction actions and states are shown for providing functionality for a user session, shown here as using Microsoft Outlook. The top bar provide access to the functions 1512 labeled "My Twiga," "Analytics," "Retrieve" and "Organize." A text box 1505 in the top center of the screen displays various anatomy and interaction status, including a note "Must Respond" and a count of emails related to the one from which the pointer originates. Highlighted subjects display workgroup-based projects 1508 such as "Project Pluto." The highlighted folder to the left denotes folders that have been created, such as for "Project Pluto," and contain emails related to specific activities within the project. The click boxes 1503 beginning with "Open" display various menu choices that users can select and execute, such as "Consolidate" to create email packages.

Figure 16:
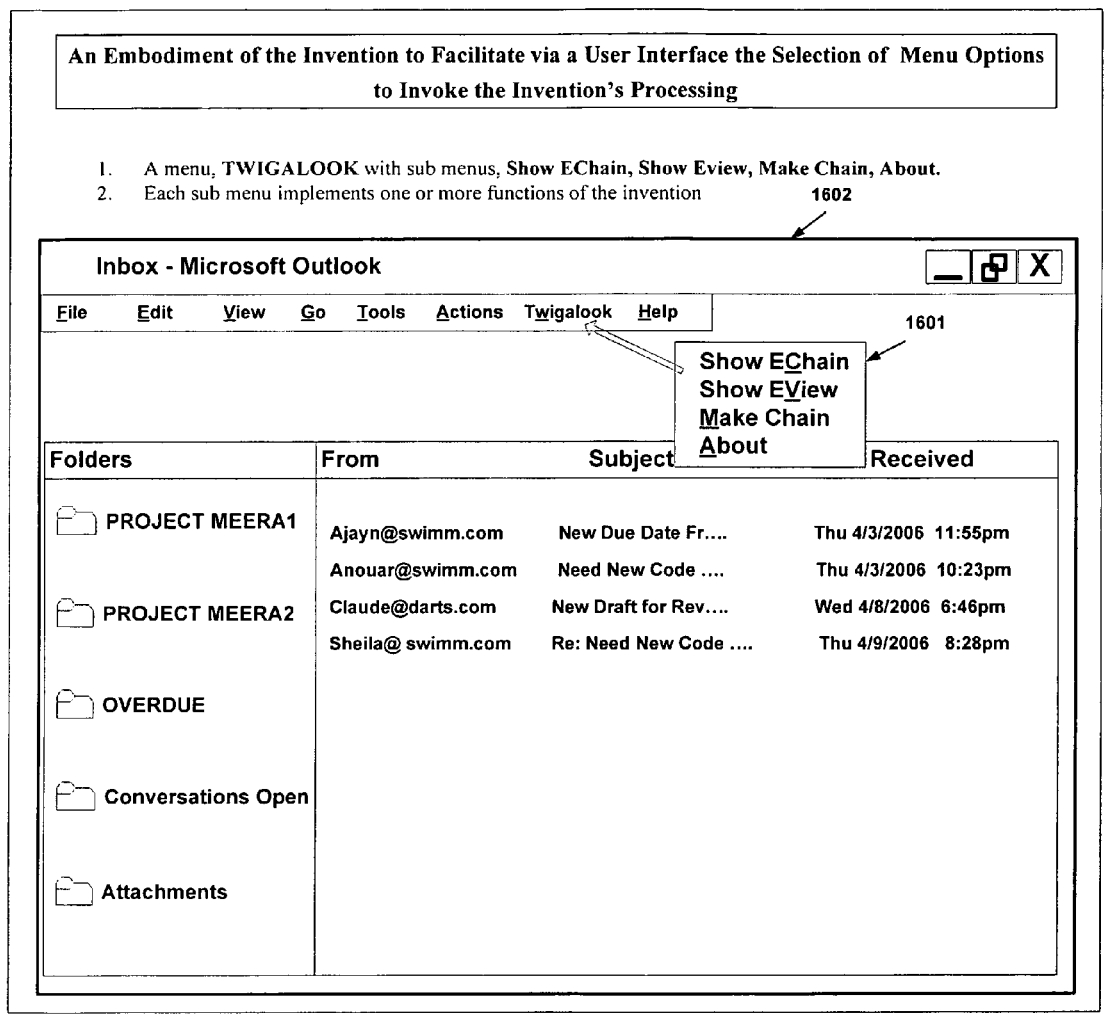
FIG. 16 illustrates an embodiment of the invention to facilitate via a user interface the selection of the menu options to invoke the invention's processing.

The present invention can be integrated with a corporate email system and/or a user session, such as shown in FIG. 16. In this embodiment a Microsoft Outlook screen is modified with an additional menu bar, which is labeled in FIG. 16 as Twigalook 1602. A number of submenus can be presented with the additional menu bar, which in this example are called "Show EChain", "Show EView", "Make EChain", and "About". Various main menus and/or submenus can be added to the toolbars or to other areas. Clicking on any menu or submenu will execute a particular function or series of steps.

Figure 17:
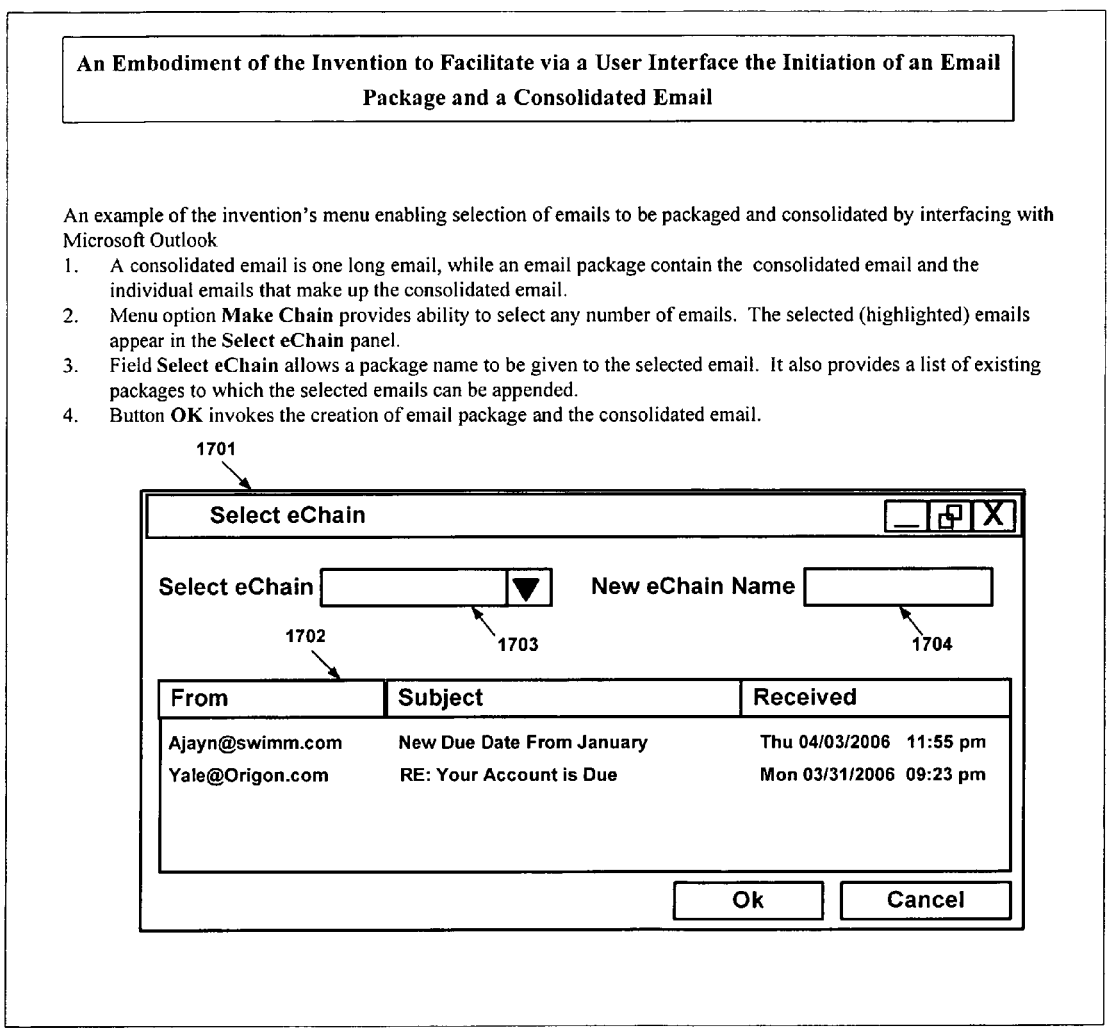
FIG. 17 illustrates an embodiment of the invention to facilitate via a user interface the initiation of an email package and a consolidated email.

FIG. 17 provides an example of how the present methods and systems can provide means for users or entities such as corporations to select any number of emails from their email session. A user is allowed to select any emails from a discussion or conversation or from different discussions, from the same or different folders, and parse, analyze and store into the system database, which in this example is accomplished using a Make Chain command. A panel 1702 can be provided that displays the selected emails, allows a user to make final choice changes, allows the user to label 1704 the new-to-be created grouping, giving it a name (or can add to an existing group of emails, or package, that is already created by the system and displayed for user selection 1703) and invoke the system to execute the parsing and storing of the emails.

FIG. 18 provides an example of a display of email packages that have been created for the user or the entity/corporation. By selecting the option eChain 1701, the display 1805 of FIG. 18 is presented to the user. The system can provide a user interface panel that will provide a summary of the package of emails that the user has previously created through the system. Summary information on the packages 1801, 1802, 1803, 1804 such as start time and end time, is displayed. The system can provide a single email that combines all the emails within a particular package. This single email can display all the original contents of emails as they were and can also show duplicates as they are, or the duplicates can be removed and only show non-duplicate contents, depending on a user's preference.

FIG. 19 provides an example of means for users or entities/corporations to perform various activities on their emails that are processed, stored and manipulated according to the present invention. The user interface 1907, which can be accessed through a user's email session, can provide various means or interaction access. In this example, a top section (called "eList") 1901 depicts a means to perform an advanced search of the system database and also a means to cross-reference attachments to their originating emails. A middle section (called "eDetails") 1903 depicts how emails and email packages saved and stored in the system database can be displayed back to the user. Along with emails, all the associated attributes (not just limited to what is shown) such as FOLDER LIST, FROM, TO, CC, and Attachments can be displayed. The system can cross-reference any email to its associated data in the boxes next to it through highlight or other means. A bottom section (called "eStats") 1906 can display intelligence, profile and pattern information about emails.

FIG. 20 provides examples of email information that can be extracted, stored and presented in the user interface. The information can be presented as historical data and using data point techniques, provide information for future trends of email interaction, use, and its recipients. Links can be associated with the presentation elements to access the associated emails. For example, a link on 'person1' can provide further details on emails associated with 'person1'. Another example is that a link a associated with a department can provide access to all emails associated with it. The links provide further details at granular level.

Figure 21:
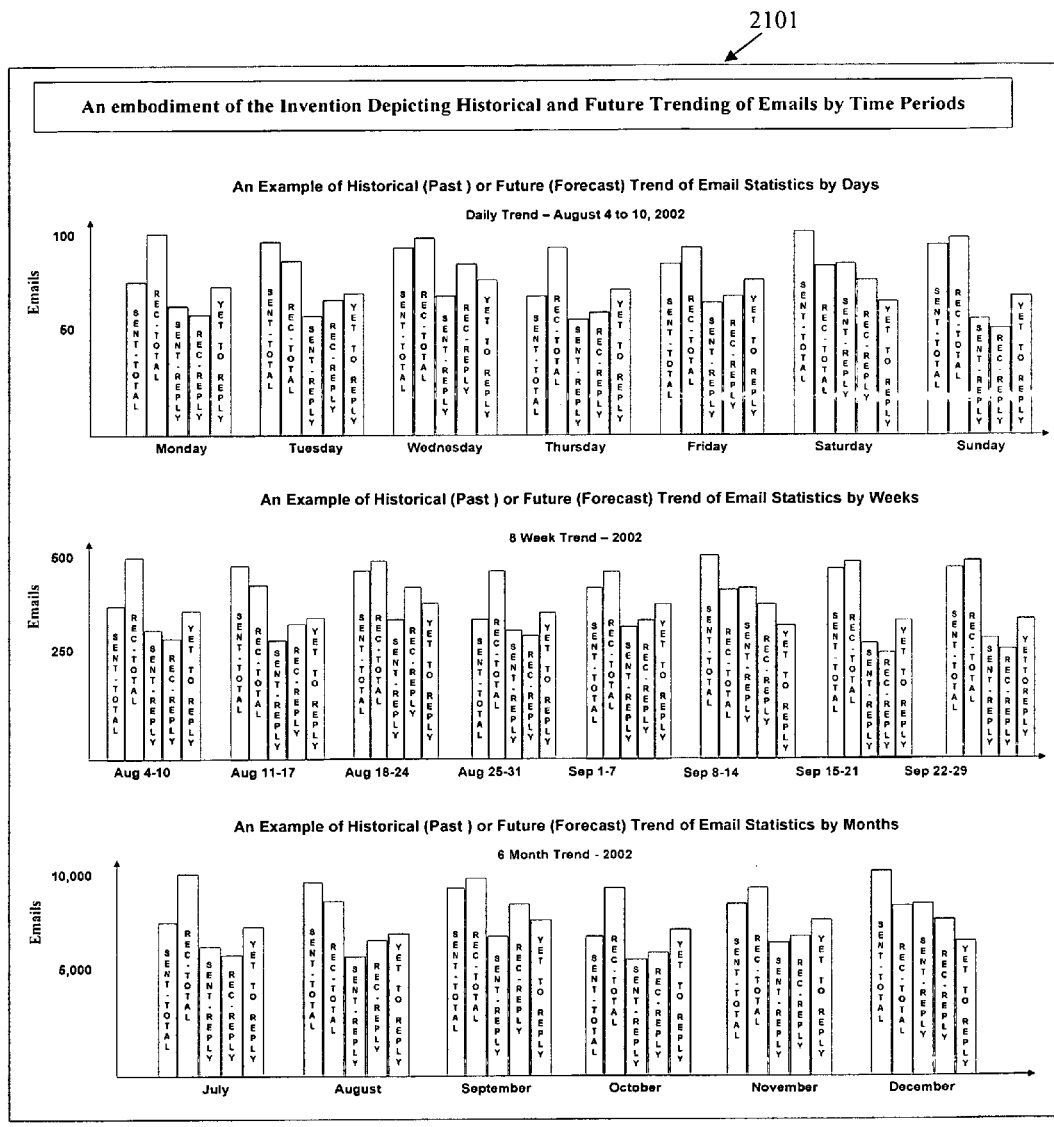
FIG. 21 illustrates an embodiment of the invention depicting historical and future trending of emails by time periods.
Figure 22:
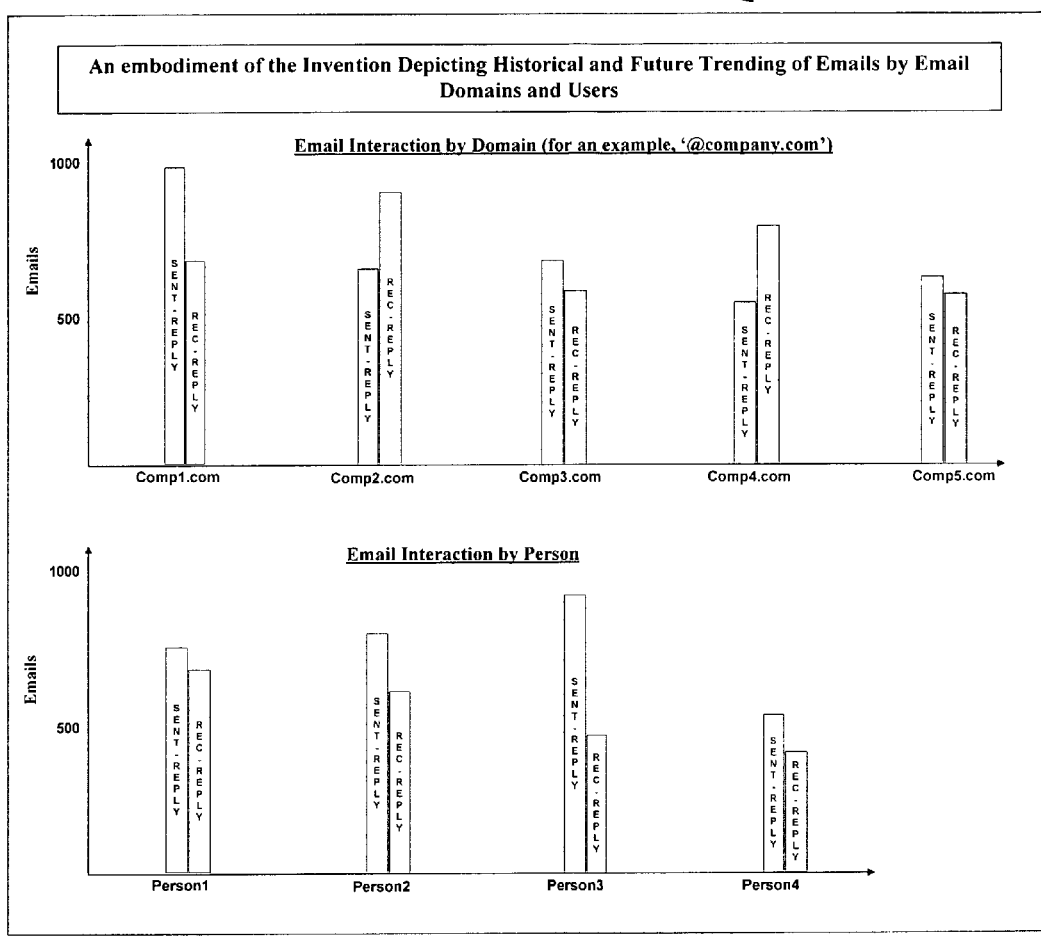
FIG. 22 illustrates an embodiment of the invention depicting historical and future trending of emails by email domains and users.

FIG. 21 and FIG. 22 provide examples of determining and presenting historical and future trending of email interactions. This can include emails by, but not limited, views by a range of days, weeks, months, years and so on. The information can further provide breakdowns by departments, companies and individual users.

Having described the invention above, various modifications in architecture, programming, steps and presentation will be apparent to those skilled in the art. It is intended that all such variations within the scope and spirit of the invention be included within the scope of the appended claims.

What is claimed is:

1. A computer implemented method for forming a consolidated email in an existing email system, supported by an existing separate database, the existing email system containing email messages, the database containing or capable of storing parsed email elements, the method of forming a consolidated email (also denoted as an email package) comprising the steps of:

selecting automatically or otherwise, emails from the email system or the inventive system;

assigning a user or system supplied name to an email package to associate and contain the consolidated email and its corresponding individual emails;

comparing, by a processor, the selected emails in the email system with emails in the database;

retrieving all the email elements of the first email from the database;

organizing the email elements into email message bodies in a time-sequence order to form a first email copy that is identical to the original first email in the email system and that is also the first consolidated email (or an email package);

linking the consolidated email and its corresponding first email copy to the email package;

storing in the database the links associated to forming the consolidated email and the first email copy for future retrieval;

retrieving from the database the email elements of the second selected email;

dividing the email elements of the second email into a body portion of email elements that contain email message bodies and a link portion of the second email that contains links to duplicate email bodies;

retrieving from the database the email message bodies that are related to link portion of the second email;

adding the email message bodies of the link portion of the second email to the second email; as a user or system option, the email bodies associated with the links may not be added to prevent duplicate email message bodies from appearing in the consolidated email;

organizing the email message bodies in a time-sequence order to form a second email copy that is identical to the original second email in the email system;

linking the consolidated email and the corresponding second email copy to the email package;

storing in the database the links that are associated to forming the consolidated email and the second email copy for future retrieval;

repeating the steps of the second email for the remaining selected emails in the email system to create the corresponding copies of emails identical to their original email counterpart in the email system, and append them to the consolidated email (or an email package) linking them to the group name and saving the links in the database for future formation;

deleting unwanted emails to remove the corresponding email portion from the consolidated email and its associated links stored in the database;

renaming, deleting, merging splitting email packages;

creating links between the interactions and action states of emails and their corresponding emails within the email package; and storing relationship links in the database.

2. The method of claim 1, further comprising using user-defined keywords and criteria to identify, group and retrieve emails containing these keywords or satisfying the criteria, the method comprising the steps of:

receiving user-defined keywords and criteria;

identifying in the database the email elements and their associated originating emails containing the keywords and satisfying the criteria;

identifying the relationship links between the keywords and criteria and the original emails that contain them; and storing the relationship links in the database.

3. The method of claim 2, further comprising creating email packages, also referred to as email workgroups, to identify and maintain related emails within a workgroup, project, a set of activities, the method comprising the steps of:

creating a workgroup;

assigning a user or system supplied name to the workgroup;

storing the workgroup name in the database;

assigning an email that is in the database to the workgroup, referencing it as the first email of the workgroup;

retrieving from the database emails that are of the same email conversation as the first email of the workgroup;

adding to the workgroup, emails from the database that are of the same conversation as the emails in the workgroup;

creating links between the emails and the workgroup;

repeating the above steps for any emails to be added to any workgroup;

renaming, deleting, merging, splitting workgroups;

removing or adding emails from one workgroup to another workgroup; and storing in the database the links that associate the workgroup with its associated emails.

4. The method of claim 3, further comprising storing email attachments and cross-referencing attachments with the original emails, the method comprising the steps of:

assigning names and sequence numbers to the attachments stored in the database;

storing names and sequence numbers in the database;

creating links to cross-reference attachments to the emails they originate from;

saving links in the database; and cross-referencing the attachments with the emails they originate from.

5. The method of claim 4, further comprising sharing email attachments across multiple users and their modifications, the method comprising the steps of:

providing user-access to an attachment in the inventive system to users who have been granted permission by the inventive system, email system security-controlling application or device;

creating a new copy of the attachment;

assigning a new versioning number to the new copy of the attachment;

locking the attachment access to other users;

permitting modification to the new copy of the attachment;

saving the attachment with modifications in the database;

storing in the database the user's identification, the time the file is saved a description of the type of change that was made;

notifying, through user or system option, the email addressees, which are included in the included in the TO, CC and BCC fields of the email that own the attachment;

releasing the lock to allow other users to access the attachment;

permitting creation of a copy of the attachment in their own system; and preventing deletion or renaming, through user or system option, of the attachment in the inventive system database.

6. The method of claim 5, further comprising determining the states of email interactions and actions, collecting, processing and displaying interaction, action and related email elements, comprising the steps of:

extracting email elements and relationship links from the database;

performing mathematical analysis and aggregations on the extracted links to produce statistical metrics for historical and future trending for any combination of email elements; and storing the results of the extracted data in the database.

7. The method of claim 6, further comprising creating relationships between emails and their associated replies and attached emails as they propagate from one email user to another; the method comprising the steps of;

identify complete or partial proliferation of any selected email as the email and its replies and forwards propagate across multiple email users;

retrieving from the database the links that associate the selected email with its replies, forwards, associated attachments, senders and recipients, email packages and email workgroups;

organizing relationships between each email and its propagation path; and storing relationship data and links in the database.

8. The method of claim 7, further comprising generating a viewable format of the information from the database, the method comprising the steps of retrieving from the database the email elements, emails, email packages, email workgroups, analytical, statistical, interaction and action states, email proliferation results and relationship links;

organizing the email elements, emails, email packages, email workgroups, analytical, statistical, interaction states, email proliferation results and relationship links in any viewable format by a computer program; and storing the resulting format in the database.

9. The method of claim 8, further comprising providing the stored relationship links, data and the resulting format in the database to computer programs, user interfaces, application program interfaces, and peripheral output devices, the method comprising the steps of retrieving the stored relationship links, data and viewable organized formats from the database;

providing the relationship links, data and organized formats to computer programs, user interfaces, application program interfaces, and peripheral output devices; and storing the interfacing information in the database.

10. A computer implemented system for forming a consolidated email in an existing email system, supported by an existing separate database, the existing email system containing email messages, the database containing or capable of storing parsed email elements, the computer implemented system comprising:

a software program stored on a computer wherein the software program is adapted to:

selecting automatically or otherwise, emails from the email system or the inventive system;

assigning a user or system supplied name to an email package to associate and contain the consolidated email and its corresponding individual emails;

comparing the selected emails in the email system with emails in the database;

retrieving all the email elements of the first email from the database;

organizing the email elements into email message bodies in a time-sequence order to form a first email copy that is identical to the original first email in the email system and that is also the first consolidated email (or an email package);

linking the consolidated email and its corresponding first email copy to the email package;

storing in the database the links associated to forming the consolidated email and the first email copy for future retrieval;

retrieving from the database the email elements of the second selected email;

dividing the email elements of the second email into a body portion of email elements that contain email message bodies and a link portion of the second email that contains links to duplicate email bodies;

retrieving from the database the email message bodies that are related to link portion of the second email;

adding the email message bodies of the link portion of the second email to the second email; as a user or system option, the email bodies associated with the links may not be added to prevent duplicate email message bodies from appearing in the consolidated email;

organizing the email message bodies in a time-sequence order to form a second email copy that is identical to the original second email in the email system;

linking the consolidated email and the corresponding second email copy to the email package;

storing in the database the links that are associated to forming the consolidated email and the second email copy for future retrieval;

repeating the steps of the second email for the remaining selected emails in the email system to create the corresponding copies of emails identical to their original email counterpart in the email system, and append them to the consolidated email (or an email package) linking them to the group name and saving the links in the database for future formation;

deleting unwanted emails to remove the corresponding email portion from the consolidated email and its associated links stored in the database;

renaming, deleting, merging splitting email packages;

creating links between the interactions and action states of emails and their corresponding emails within the email package;

storing relationship links in the database wherein the software program is further adapted to perform steps of claims 2-9.

* * * * *